(12) United States Patent
Choi et al.

(10) Patent No.: US 12,450,829 B2
(45) Date of Patent: Oct. 21, 2025

(54) VIRTUAL REALITY CONTROL SYSTEM

(71) Applicant: SKONEC ENTERTAINMENT CO., LTD., Seoul (KR)

(72) Inventors: Jeong Hwoan Choi, Yongin-si (KR); Jong Hyun Yuk, Seoul (KR); Chul Kwon, Seoul (KR); Young Moon Lee, Seoul (KR); Seung Buem Back, Yongin-si (KR)

(73) Assignee: SKONEC ENTERTAINMENT CO., LTD., Seoul (KR)

( * ) Notice: Subject to any disclaimer, the term of this patent is extended or adjusted under 35 U.S.C. 154(b) by 0 days.

(21) Appl. No.: 18/511,636

(22) Filed: Nov. 16, 2023

(65) Prior Publication Data

US 2024/0221303 A1 Jul. 4, 2024

Related U.S. Application Data

(63) Continuation of application No. 18/511,531, filed on Nov. 16, 2023, now Pat. No. 12,322,040, which is a
(Continued)

(30) Foreign Application Priority Data

Dec. 29, 2022 (KR) .................. 10-2022-0189365

(51) Int. Cl.
*G06T 17/00* (2006.01)
*G02B 27/01* (2006.01)
(Continued)

(52) U.S. Cl.
CPC .......... *G06T 17/00* (2013.01); *G02B 27/0172* (2013.01); *G06F 3/012* (2013.01);
(Continued)

(58) Field of Classification Search
CPC .......... G06T 17/00; G06T 7/246; G06T 7/73; G06T 19/003; G06T 2207/30196;
(Continued)

(56) References Cited

U.S. PATENT DOCUMENTS 10,675,766 B1 * 6/2020 Niemeyer .............. B25J 13/025
11,097,186 B1 * 8/2021 Hickman .............. A63F 13/795
(Continued)

FOREIGN PATENT DOCUMENTS

KR 10-2020-0066962 A 6/2020
KR 10-2020-0091257 A 7/2020
(Continued)

OTHER PUBLICATIONS

KR Decision to Grant Dated Nov. 30, 2023 as received in Application No. 10-2022-0189365.
(Continued)

*Primary Examiner* — William Lu
(74) *Attorney, Agent, or Firm* — Maschoff Brennan

(57) ABSTRACT

Disclosed herein is a virtual reality control system including a large space, a head-mounted display (HMD) worn on a body of a user and configured to output an image, a tracking device disposed on at least a part of the body of the user, a plurality of optical camera sensors disposed in the large space, and a server which stores content information on a specified scenario, wherein the server can acquire first location information on a first user on the basis of first sensor data on the HMD, which is acquired through the plurality of optical camera sensors, acquire second location information on at least a part of a body of the first user on the basis of second sensor data on the tracking device, which is acquired through the plurality of optical camera sensors, convert the first location information and the second location information to acquire content change information, and control the
(Continued)

HMD to output an image on the basis of the content change information.

12 Claims, 21 Drawing Sheets

Related U.S. Application Data continuation of application No. PCT/KR2023/015619, filed on Oct. 11, 2023.

(51) Int. Cl.
  *G06F 3/01* (2006.01)
  *G06T 7/246* (2017.01)
  *G06T 7/73* (2017.01)
  *G06T 19/00* (2011.01)
  *G09B 5/02* (2006.01)
  *G09G 3/00* (2006.01)

(52) U.S. Cl.
  CPC ............... *G06T 7/246* (2017.01); *G06T 7/73* (2017.01); *G06T 19/003* (2013.01); *G09G 3/001* (2013.01); *G06T 2207/30196* (2013.01); *G06T 2207/30204* (2013.01); *G06T 2219/024* (2013.01); *G09B 5/02* (2013.01); *G09G 2354/00* (2013.01)

(58) Field of Classification Search
  CPC .... G06T 2207/30204; G06T 2219/024; G02B 27/0172; G02B 2027/0138; G02B 2027/014; G02B 27/017; G06F 3/012; G06F 3/011; G09G 3/001; G09G 2354/00; G09B 5/02
  See application file for complete search history.

(56) References Cited

U.S. PATENT DOCUMENTS

| | | | | |
|---|---|---|---|---|
| 11,181,986 B2* | 11/2021 | Chen | ........................ | G06F 3/017 |
| 11,199,711 B2* | 12/2021 | Nuber | .................... | G06T 19/006 |
| 2003/0137449 A1* | 7/2003 | Vashisth | ................ | G01C 11/02 |
| | | | | 342/357.31 |
| 2011/0244959 A1* | 10/2011 | Inagaki | .................. | G06V 40/28 |
| | | | | 463/31 |
| 2016/0054837 A1* | 2/2016 | Stafford | ................. | G02B 27/01 |
| | | | | 463/33 |
| 2016/0232715 A1* | 8/2016 | Lee | ......................... | G06F 3/011 |
| 2016/0275722 A1* | 9/2016 | Bretschneider | ....... | A63F 13/323 |
| 2017/0168592 A1* | 6/2017 | Mishyn | ................. | G06F 3/0325 |
| 2017/0274275 A1* | 9/2017 | Vandonkelaar | ........ | G06V 20/52 |
| 2017/0285733 A1* | 10/2017 | Bretschneider | ......... | A63F 13/69 |
| 2017/0351094 A1* | 12/2017 | Poulos | ................. | G02B 27/017 |
| 2017/0358139 A1* | 12/2017 | Balan | .................... | G02B 27/017 |
| 2018/0276463 A1* | 9/2018 | Pritz | ...................... | G06V 20/52 |
| 2018/0308288 A1* | 10/2018 | Harscoet | ............. | G06F 3/04815 |
| 2019/0012832 A1* | 1/2019 | Sun | ....................... | G06T 19/003 |
| 2019/0041988 A1* | 2/2019 | Pohl | ....................... | G06F 3/011 |
| 2020/0174556 A1* | 6/2020 | Kim | ....................... | G06F 3/017 |
| 2020/0320768 A1* | 10/2020 | Salemme | ............... | A61B 5/123 |
| 2020/0351537 A1* | 11/2020 | Browy | ................. | G06T 19/003 |
| 2020/0357187 A1* | 11/2020 | Drouin | ................ | G06F 3/0484 |
| 2021/0116990 A1* | 4/2021 | Song | ...................... | A63F 13/25 |
| 2021/0158032 A1* | 5/2021 | Baek | ...................... | G06V 40/23 |
| 2022/0207841 A1* | 6/2022 | Alqadi | .................. | G06T 19/006 |
| 2022/0214743 A1* | 7/2022 | Dascola | ................ | G06F 3/017 |
| 2023/0005227 A1* | 1/2023 | Kim | .......................... | G06F 1/16 |
| 2023/0229823 A1* | 7/2023 | Wodrich | ................ | G06F 3/011 |
| | | | | 455/456.3 |

FOREIGN PATENT DOCUMENTS

| | | |
|---|---|---|
| KR | 10-2212510 B1 | 2/2021 |
| KR | 10-2250869 B1 | 5/2021 |
| KR | 10-2022-0062938 A | 5/2022 |

OTHER PUBLICATIONS

International Search Report and Written Opinion of the International Searching Authority dated Jan. 22, 2024 as received in Application No. PCT/KR2023/015619.

* cited by examiner

FIG. 17
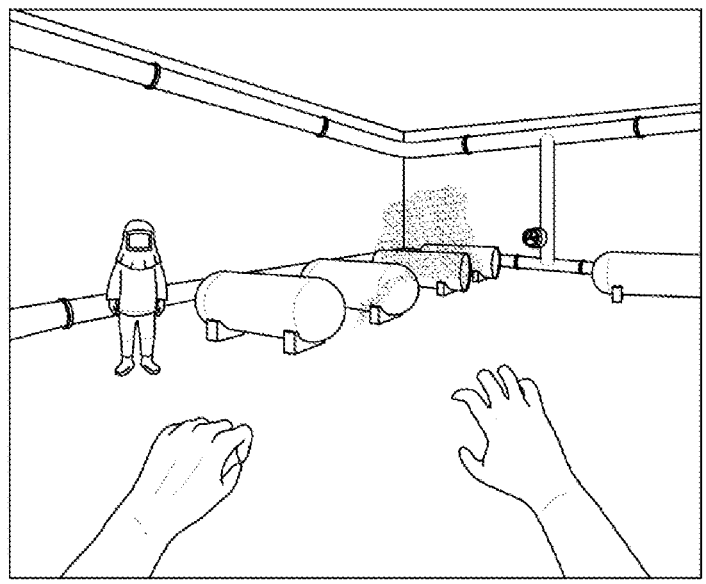
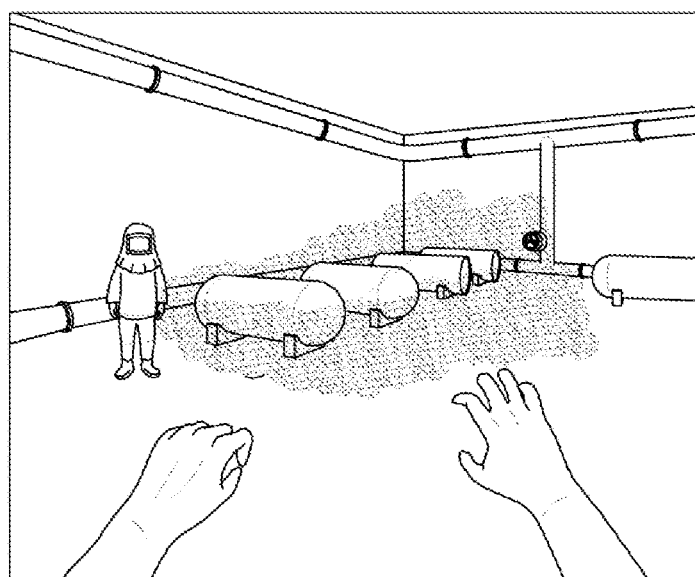

VIRTUAL REALITY CONTROL SYSTEM

CROSS-REFERENCE TO RELATED APPLICATION(S)

This application is a continuation of Ser. No. 18/511,531, filed on Nov. 15, 2023, which is a bypass continuation of International Application No. PCT/KR2023/015619, filed on Oct. 11, 2023, which is based on and claims priority to Korean Patent Application No. 10-2022-0189365, filed on Dec. 29, 2022, in the Korean Intellectual Property Office, the disclosures of which are incorporated by reference herein in their entireties.

BACKGROUND

1. Field

The disclosure relates to a virtual reality control system. More specifically, the present disclosure relates to a virtual reality control system that provides virtual reality to a user based on a location of the user in reality to virtually provide a situation that is difficult for the user to experience directly.

2. Description of Related Art

Virtual reality may be a technology for providing a user with virtual information based on reality by adding the virtual information to reality or providing a state of a target in reality as a virtual reality image generated by a program.

The virtual reality provision technology may include a technology for generating a virtual space, a virtual character, and a virtual object using a program on the basis of information on states of targets such as users or objects provided in reality. In this case, a virtual reality control system uses various sensors to acquire information on the state of the target.

A variety of disaster training can be provided to users using a virtual reality system, and recent research on ways to improve the immersion of users experiencing virtual reality is actively underway.

Meanwhile, in order to display a character corresponding to a user in virtual reality, an electronic device including a display (e.g., a head-mounted display (HMD)) may be used. For example, a character corresponding to the user can be displayed by identifying a location (including a direction) of the HMD device through various sensors.

However, while displaying the character in virtual reality, there is a limitation that it is difficult to display the character corresponding to realistic human movements using only the existing tracking device. In addition, when a virtual reality image is provided by directly reflecting the location identified based on the tracking device, a motion image of which a motion, in which a person can realistically take a motion, out of a range may be displayed so that the sense of immersion of the user may be degraded.

In addition, when the user takes a motion on a virtual object which exists in virtual reality, there is a limitation that it is difficult to recognize the user's motion in detail on the virtual object using only the existing tracking device. For example, when a specified motion condition is set for a virtual object, there is a limitation that it is difficult to identify whether a character corresponding to the user performs the specified motion condition using only the existing tracking device. Therefore, the sense of immersion of the user experiencing virtual reality may be degraded.

According to various embodiments disclosed herein which provide virtual reality to a user, there is provided a virtual reality system that can display a character corresponding to the user more realistically through an active marker worn on a part of a body of the user and can recognize a motion of the user in detail to display the character.

SUMMARY

In accordance with various embodiments of the present disclosure, a user can increase awareness of disasters and conduct disaster training by directly or indirectly experiencing disasters through a disaster training content.

In accordance with various embodiments of the present disclosure, by implementing disasters, which may actually occur, in virtual reality, the user can increase the sense of immersion and interest.

In accordance with various embodiments of the present disclosure, in providing virtual reality to the user, the sense of immersion and interest of the user can be improved as a character realistically moves in response to a motion of the user.

In accordance with various embodiments of the present disclosure, by experiencing the same operations of various devices, which exist in reality, in virtual reality, the user can improve the sense of immersion and interest and can experience virtual reality in more diverse scenarios.

The effects of the present disclosure are not limited to the above-described effects, and effects not mentioned will be apparently understood by those skilled in the art to which the present disclosure pertains from the present specification and the accompanying drawings.

According to an aspect of the disclosure, a virtual reality control system includes a large space, a head-mounted display (HMD) worn on a body of a user and configured to output an image, a tracking device disposed on at least a part of the body of the user, a plurality of optical camera sensors disposed in the large space, and a server which stores content information on a specified scenario, wherein the server may acquire first location information on a first user on the basis of first sensor data on the HMD, which is acquired through the plurality of optical camera sensors, acquire second location information on at least a part of a body of the first user on the basis of second sensor data on the tracking device, which is acquired through the plurality of optical camera sensors, convert the first location information and the second location information to acquire content change information, and control the HMD to output an image on the basis of the content change information.

BRIEF DESCRIPTION OF THE DRAWINGS

FIG. 17 is a diagram illustrating that a gas and a character are displayed in virtual reality according to various embodiments.

DETAILED DESCRIPTION

Figure 1:
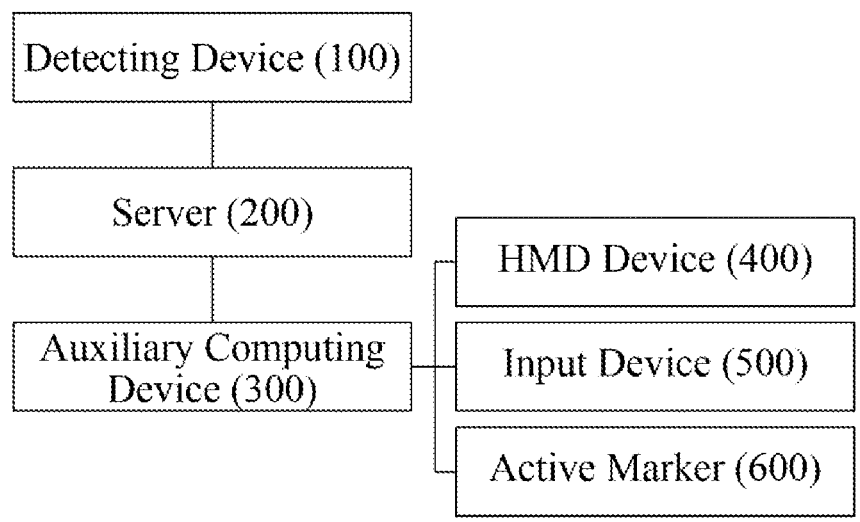
FIG. 1 is a diagram illustrating a virtual reality control system according to various embodiments.

Specific structural and functional descriptions of various embodiments are illustrative only for the purpose of describing the various embodiments, and the various embodiments may be implemented in various forms and should not be construed as being limited to embodiments described in the present specification or application.

The various embodiments may be variously modified and may have various forms so that the various embodiments will be illustrated in the drawings and be described in detail in the present specification or application. However, the matters disclosed in the drawings are not intended to specify or limit the various embodiments and should be understood to include all changes, equivalents, and substitutes included in the spirit and technical scope of the various embodiments.

The terms first, second, and/or the like may be used to describe various components, but the components should not be limited by these terms. These terms may be used only for the purpose of distinguishing one component from another component, and, for example, a first component may be referred to as a second element, and similarly, the second component may also be referred to as the first component without departing from the scope of the present disclosure.

When a component is referred to as being "connected," or "coupled" to another component, it may be directly connected or coupled to another component, but it should be understood that yet another component may be present between the component and another component. Conversely, when a component is referred to as being "directly connected" or "directly coupled" to another, it should be understood that still another component may not be present between the component and another component. Other expressions describing the relationship between components, that is, "between" and "immediately between," or "adjacent to" and "directly adjacent to" should also be construed as described above.

Terms used herein is used only for the purpose of describing specific embodiments and are not intended to limit the various embodiments. Unless the context clearly dictates otherwise, the singular form includes the plural form. In the present specification, the terms "comprising," "having," or the like are used to specify that a feature, a number, a step, an operation, a component, an element, or a combination thereof described herein is present, and it should be understood that the terms do not preclude the presence or addition of one or more other features, numbers, steps, operations, components, elements, or combinations thereof.

Unless defined otherwise, all terms including technical or scientific terms used herein have the same meaning as commonly understood by those skill in the art to which the present disclosure pertains. General terms that are defined in a dictionary shall be construed to have meanings that are consistent in the context of the relevant art and will not be interpreted as having an idealistic or excessively formalistic meaning unless clearly defined in the present specification.

Hereinafter, exemplary embodiments of the present disclosure will be described in detail with reference to the accompanying drawings. The same reference numerals in each drawing indicate the same members.

The present disclosure relates to a virtual reality (VR) control system, and the VR control system may provide VR to allow a user to experience a situation, which is difficult for the user to experience in reality due to space and time constraints or a limitation in implementation or occurrence, in a virtual space.

Here, unlike the real world, the VR may be an artificial environment generated by a program.

The VR may be typically classified into VR which generates a virtual space separated from reality by a program and provides an image of the virtual space, augmented reality (AR) which provides one image by overlapping virtual images based on the real world, and mixed reality (MR) which combines the real world and VR, provides a virtual space, and provides an image of the virtual space.

In describing the VR below, the VR may be a virtual environment providing various types of virtual spaces in addition to the above-described VR, AR, and MR.

Hereinafter, a VR control system 10 for providing VR according to various embodiments will be described with reference to FIG. 1.

FIG. 1 is a diagram illustrating a VR control system according to various embodiments.

Referring to FIG. 1, the VR control system 10 may include a detecting device 100, a server 200, an auxiliary computing device 300, a head mounted display (HMD) device 400, and an input device 500.

According to various embodiments, the detecting device 100 may be connected to the server 200. The detecting device 100 may track a target to acquire detecting information.

According to various embodiments, the detecting device 100 of the present disclosure may include an optical camera sensor. For example, the detecting device 100 may include an optical camera sensor which generates three-dimensional coordinates of a target through triangulation. Thus, the detecting device 100 may be the optical camera sensor.

According to various embodiments, the target may be an object that affects an image output through the HMD device 400. For example, the target may include at least one among the HMD device 400, the user, the input device 500, an active marker 600, an object located around the user, such as a real object, and an object having a reference point or a feature point.

According to various embodiments, tracking of the target may mean obtaining information on a location of the target in a real environment. For example, the tracking of the target may acquire information on a location that is changed as the target moves in the real environment. The location information on the target may be acquired at a predetermined period, but the present disclosure is not limited thereto.

According to various embodiments, the detecting device 100 may provide detecting information to the server 200. According to various embodiments, the server 200 may be connected to the detecting device 100 and the auxiliary computing device 300. The server 200 may acquire information from connected components.

According to various embodiments, the server 200 may acquire at least one among detecting information from the detecting device 100, image information acquired by the detecting device 100, and status information of the detecting device 100. In addition, the server 200 may acquire various pieces of information according to some embodiments which will be described below.

According to various embodiments, the server 200 may control connected components. For example, the server 200 may control the auxiliary computing device 300 or the HMD device 400.

According to various embodiments, the server 200 may control an operation of a program or application installed on the auxiliary computing device 300. For example, the server 200 may control start and/or end of a program or application installed on the auxiliary computing device 300. In addition, according to various embodiments, the server 200 may perform authentication of a program or application running on the auxiliary computing device 300.

According to various embodiments, the server 200 may provide various settings required for the operation of the detecting device 100.

According to various embodiments, the server 200 may generate location information on the target on the basis of detecting information or generate virtual location information corresponding to a location of the target in VR.

According to various embodiments, the functions of the server 200 are not limited to the above-described functions, and a server 200 performing various functions according to embodiments may be provided.

According to various embodiments, the server 200 should not be necessarily provided as a single physical component, but may be provided as a plurality of devices, each performing a function by subdividing the above-described functions.

For example, the server 200 may be subdivided into a detecting server which is connected to the detecting device 100 and acquires location information on the basis of detecting information, an operating server which performs control at least some of components provided in the VR control system 10, and a license server which performs authentication for a program or application running on at least one of the components of the VR control system 10, and each function may be performed by each server. According to various embodiments, the server 200 may receive an input signal acquired by the auxiliary computing device 300 from the input device 500 or input information based on the input signal. The input information may include user selection information on an object within the VR, information on a motion input through the input device 500, and orientation information on an orientation direction of the input device 500.

According to various embodiments, the server 200 may acquire an input signal obtained by the auxiliary computing device 300 from the active marker 600. According to various embodiments, the input signal may include orientation information on an orientation direction and location information of the active marker 600.

According to various embodiments, in the present disclosure, the auxiliary computing device 300 may be a VR backpack personal computer (PC). The auxiliary computing device 300 is a VR backpack PC and may be a backpack-type PC equipped with a high-performance central processing unit (CPU) and a high-performance graphics processing unit (GPU) which are powered by a battery so that the user can freely move around the virtual space.

According to various embodiments, the auxiliary computing device 300 may be connected to at least one among the detecting device 100, the server 200, the HMD device 400, the input device 500, and the active marker 600.

According to various embodiments, the auxiliary computing device 300 may calculate virtual location information on the basis of location information acquired from the server 200. For example, the auxiliary computing device 300 may process the detecting information acquired from the detecting device 100 to calculate the location information of the target or calculate the virtual location information.

According to various embodiments, the auxiliary computing device 300 may provide an image to the user through a display included in the HMD device 400 through a pre-stored program or application.

According to various embodiments, the auxiliary computing device 300 may provide sound information which is to be provided to the user through the HMD device 400. Thus, the HMD device 400 may output the sound information acquired from the auxiliary computing device 300.

According to various embodiments, the auxiliary computing device 300 may acquire an image, which is to be provided to the user, on the basis of the location information through a pre-installed application or program.

According to various embodiments, the auxiliary computing device 300 may acquire input information on the basis of the input signal acquired from the input device 500. According to various embodiments, the auxiliary computing device 300 may acquire an image, which is to be provided to the user, by considering the acquired input information.

According to various embodiments, the HMD device 400 may be connected to the auxiliary computing device 300. The HMD device 400 may provide a VR image to the user through the display included in the HMD device 400. For example, the HMD device 400 may visually output the VR image, which is acquired from the auxiliary computing device 300, to the user.

According to various embodiments, the input device 500 may acquire a signal for a user's input to be reflected in the VR. According to various embodiments, the input device 500 may be connected to the auxiliary computing device 300. According to various embodiments, the input device 500 may provide the auxiliary computing device 300 with an input signal corresponding to the user's input.

According to various embodiments, in order to acquire a signal corresponding to a motion of the user, the input device 500 may include an acceleration sensor, a gyroscope, a gyro sensor, a micro electromechanical systems (MEMS), a geomagnetic sensor, an inertial sensor (inertial measurement unit (IMU)), an optical sensor, an illumination sensor, a photo sensor, an infrared sensor, a color sensor, a depth sensor, and an electromagnetic wave sensor.

In addition, in order to acquire a signal for a user's selection, the input device 500 may include a button, a switch, a jog shuttle, and a wheel. In addition, the input device 500 may be connected to the auxiliary computing device 300 through at least one of a wired communication manner and a wireless communication manner. In addition, the input device 500 may include a communication module for communicating with the auxiliary computing device 300.

In FIG. 1, the input device 500 has been shown to be connected to the auxiliary computing device 300, but the present disclosure is not limited thereto, and the input device 500 may be provided in various connection forms depending on selection. For example, the input device 500 may be connected to at least one of the server 200 and the HMD device 400 and may provide an input signal thereto.

According to various embodiments, the active marker 600 may be provided on at least a part of the body of the user and identified through the detecting device 100. For example, the active marker 600 may transmit itself an optical signal, and the transmitted optical signal may be detected by the detecting device 100. According to various embodiments, the active marker 600 may include (corresponds) a glove sensor which is a device worn on a user's hand to track the hand, rigid body marker(s) attached to the body of the user, and active light-emitting diode (LED) sensors. For example, the active marker 600 may be expressed as a tracking device. According to various embodiments, the active LED sensors (or the rigid body marker(s)) may be attached to parts of the body of the user, including the user's head, right hand, left hand, waist, left leg, and/or right leg.

According to various embodiments, the active marker 600 may include an LED module, a radio wave generator, or similar components.

According to various embodiments, in FIG. 1, the active marker 600 is shown to be connected to the auxiliary computing device 300, but the present disclosure is not limited thereto, and the active marker 600 may be provided in various connection forms depending on selection. For example, the active marker 600 may be connected to at least one of the server 200 and the HMD device 400. In addition, the active marker 600 may provide an optical signal.

The above-described VR control system 10 is merely an example for convenience of description, but the VR control system 10 according to one embodiment is not limited to the configuration and connection relationship shown in FIG. 1, and the VR control system 1 may be provided in various forms depending on selection.

According to various embodiments, the auxiliary computing device 300 and the HMD device 400 may be provided as one component, and in this case, the operation performed by the auxiliary computing device 300 may be implemented in the HMD device 400.

According to various embodiments, controllers included in the auxiliary computing device 300, the server 200, and the HMD device 400 may be provided as one component. For example, at least one of the controllers included in the auxiliary computing device 300, the server 200, and the HMD device 400 may be implemented as an electronic device 1000 which will be described with reference to FIG. 9.

Figure 2:
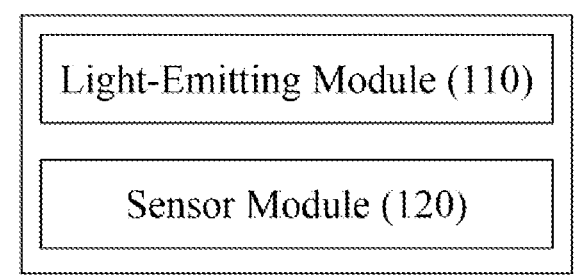
FIG. 2 is a diagram illustrating a detecting device according to various embodiments.

FIG. 2 is a diagram illustrating a detecting device according to various embodiments.

Referring to FIG. 2, the detecting device 100 may include a light-emitting module 110 and a sensor module 120. The above-described components may be operatively or electrically connected to each other. The components of the detecting device 100 shown in FIG. 2 are examples, and some of the components may be modified, deleted, or added.

According to various embodiments, for target tracking, the light-emitting module 110 may transmit a signal to the target or surroundings of the target. According to various embodiments, the light-emitting module 110 may be provided as a light-emitting device which emits optical signals, such as visible light and infrared light, to external components. For example, the light-emitting module 110 may be provided as a visible light LED and an infrared LED.

According to various embodiments, the sensor module 120 may acquire a signal from the external component. For example, the sensor module 120 may acquire a signal corresponding to the signal transmitted by the light-emitting module 110.

According to various embodiments, the sensor module 120 may acquire a signal with respect to light reflected by a marker provided on a target. For example, the sensor module 120 may acquire an optical signal through the HMD device 400 and the active marker 600.

Figure 3:
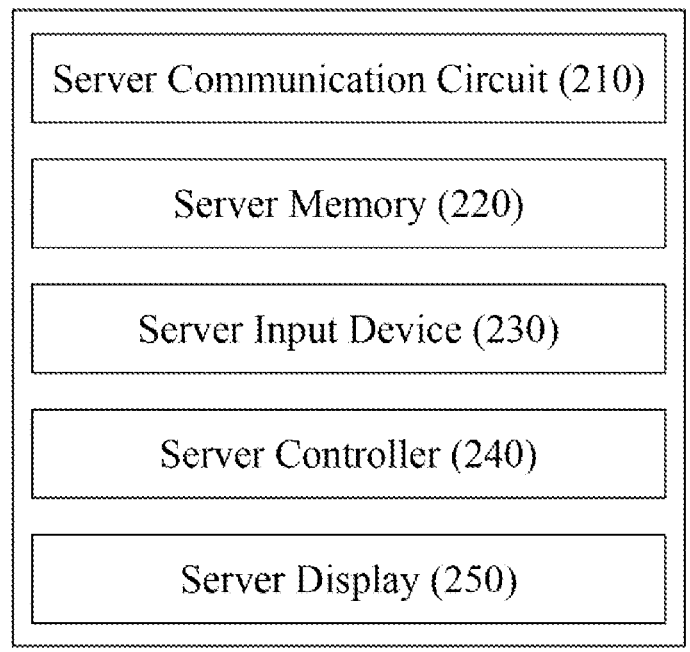
FIG. 3 is a diagram illustrating a server according to various embodiments.

According to various embodiments, the sensor module 120 may be provided as an image sensor, an optical sensor, an illumination sensor, a photo sensor, an infrared sensor, a color sensor, a depth sensor, or an electromagnetic wave sensor. FIG. 3 is a diagram illustrating a server according to various embodiments.

Referring to FIG. 3, the server 200 may include at least one among a server communication circuit 210, a server memory 220, a server input device 230, a server controller 240, and a server display 250. The above-described components may be operatively or electrically connected to each other. The components of the server 200 shown in FIG. 3 are examples, and some of the components may be modified, deleted, or added.

The server communication circuit 210 may be connected to at least one among the detecting device 100, the auxiliary computing device 300, the HMD device 400, the input device 500, and the active marker 600 and acquire or provide data.

According to various embodiments, the server communication circuit 210 may be connected to at least one among the detecting device 100, the auxiliary computing device 300, the HMD device 400, the input device 500, and the active marker 600 through at least one communication manner of wired communication and wireless communication. For example, the wireless communication may include a mobile communication network such as a Wi-Fi network, a third-generation (3G) network, a long term evolution (LTE) network, a 5G network, or a LoRa network, a wireless access in vehicular environment (WAVE), beacon, Zigbee, Bluetooth, or Bluetooth low energy (BLE). In addition, the wired communication may include a twisted pair cable, a coaxial cable, or an optical cable. The server communication circuit 210 may be provided as a communication module for providing at least one communication manner of wired communication and wireless communication.

According to various embodiments, the server memory 220 may store data. For example, the server memory 220 may store information acquired from the outside.

According to various embodiments, the server memory 220 may store information required for an operation of the server 200. For example, the server memory 220 may be provided as a magnetic medium such as a hard disk, a floppy disk, or a magnetic tape, an optical recording medium such as a compact disc read only memory (CD-ROM) or a digital versatile disc (DVD), a magneto-optical medium such as a floptical disk, a read only memory (ROM), a random access memory (RAM), a flash memory, a solid state drive (SSD), or a universal serial bus (USB).

According to various embodiments, the server input device 230 may acquire a signal corresponding to a user's input. The user's input may be, for example, pressing, clicking, touching, or dragging a button. According to various embodiments, the server input device 230 may be implemented as, for example, a keyboard, a key pad, a button, a jog shuttle, or a wheel.

According to various embodiments, the server controller 240 may control the operation of the server 200. For example, the server controller 240 may control operations of components included in the server 200.

According to various embodiments, the server display 250 may output visual information. For example, the server display 250 may be provided as a monitor, a television, or a display panel, which outputs the visual information.

According to various embodiments, when the server display 250 is provided as a touch screen, the server display 250 may perform the function of the server input device 230.

Figure 4:
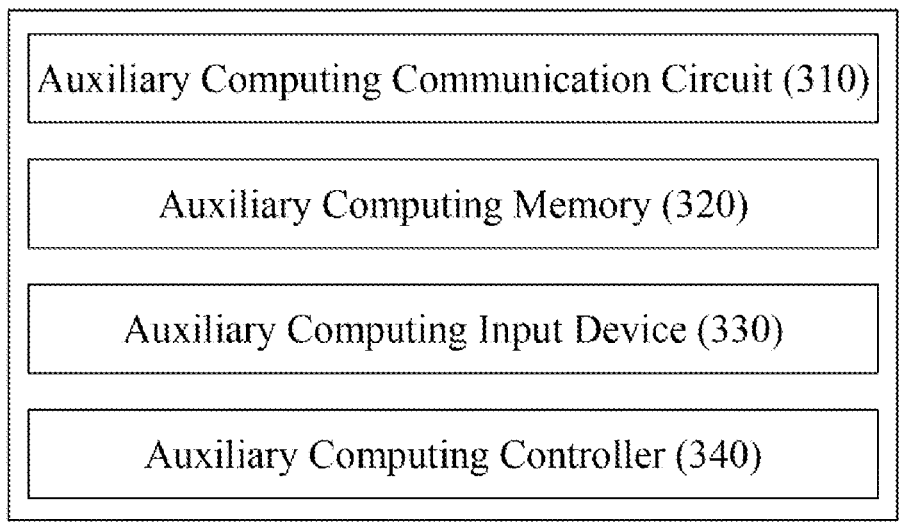
FIG. 4 is a diagram illustrating an auxiliary computing device according to various embodiments.

FIG. 4 is a diagram illustrating an auxiliary computing device according to various embodiments.

Referring to FIG. 4, the auxiliary computing device 300 may include at least one among an auxiliary computing communication circuit 310, an auxiliary computing memory 320, an auxiliary computing input device 330, and an auxiliary compute controller 340. The above-described components may be operatively or electrically connected to each other. The components of the auxiliary computing device 300 shown in FIG. 4 are examples, and some of the components may be modified, deleted, or added.

According to various embodiments, the auxiliary computing communication circuit 310 may be connected to at least one among the server 200, the HMD device 400, the input device 500, and the active marker 600.

According to various embodiments, the auxiliary computing communication circuit 310 may be connected to at least one among the server 2000, the HMD device 400, the input device 500, and the active marker 600 through at least one communication manner of wired communication and wireless communication.

According to various embodiments, the auxiliary computing communication circuit 310 may exchange information with at least one among the server 200, the HMD device 400, the input device 500, and the active marker 600, which are connected to the auxiliary computing communication circuit 310. For example, the wireless communication may include a mobile communication network such as a Wi-Fi network, a 3G network, an LTE network, a 5G network, or a LoRa network, WAVE, beacon, Zigbee, Bluetooth, or BLE. For example, the wired communication may include a twisted pair cable, a coaxial cable, or an optical cable.

According to various embodiments, the auxiliary computing communication circuit 310 may be provided as a communication module for providing at least one communication manner of wireless communication and wired communication.

According to various embodiments, the auxiliary computing memory 320 may store information acquired from the outside. In addition, the auxiliary computing memory 320 may store data required for the operation of the auxiliary computing device 300. For example, the auxiliary computing memory 320 may store an application or program for providing a virtual experience to a user.

According to various embodiments, the auxiliary computing input device 330 may acquire a signal corresponding to a user's input. The user's input may be, for example, pressing, clicking, touching, or dragging a button. For example, the auxiliary computing input device 330 may be implemented as a keyboard, a key pad, a button, a jog shuttle, or a wheel.

According to various embodiments, the auxiliary compute controller 340 may control the operation of the auxiliary computing device 300.

Figure 5:
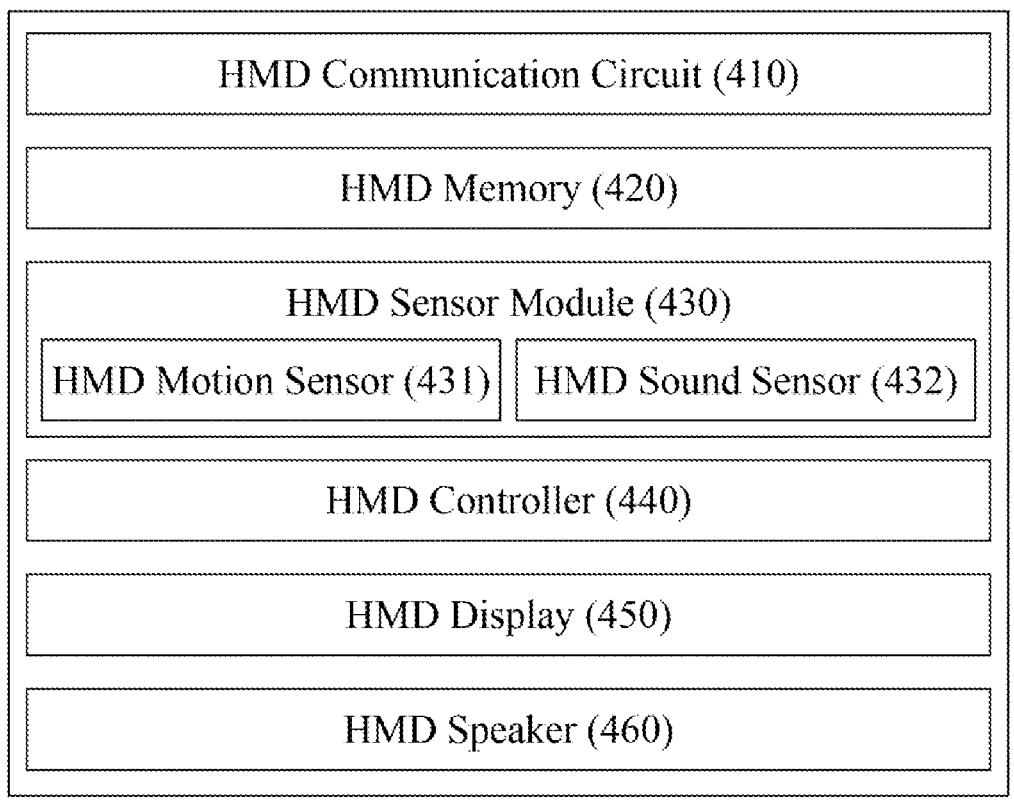
FIG. 5 is a diagram illustrating a head mounted display (HMD) device according to various embodiments.

FIG. 5 is a diagram illustrating the HMD device 400 according to various embodiments.

Referring to FIG. 5, the HMD device 400 may include at least one among an HMD communication circuit 410, an HMD memory 420, an HMD sensor module 430, an HMD controller 440, an HMD display 450, and an HMD speaker 460. The HMD device 400 of the present disclosure may be expressed as an HMD.

The above-described components may be operatively or electrically connected to each other. The components of the HMD device 400 shown in FIG. 5 are examples, and some of the components may be modified, deleted, or added.

According to various embodiments, the HMD communication circuit 410 may be connected to the auxiliary computing device 300. The HMD communication circuit 410 may be connected to the auxiliary computing device 300 through at least one communication manner of wired communication and wireless communication.

According to various embodiments, the HMD memory 420 may store data. The HMD memory 420 may store an application or program required for the operation of the HMD device 400. In addition, the HMD memory 420 may store information acquired from the outside.

According to various embodiments, the HMD sensor module 430 may acquire signals corresponding to a status of the HMD device 400 and the user's input. The HMD sensor module 430 according to various embodiments may include an HMD motion sensor 431 and/or an HMD sound sensor 432.

According to various embodiments, the HMD motion sensor 431 may acquire a signal with respect to a status of the HMD device 400. According to various embodiments, the HMD motion sensor 431 may acquire rotation information on rotation of the HMD device 400.

According to various embodiments, the HMD motion sensor 431 may acquire movement information on location movement of the HMD device 400. According to various embodiments, the HMD motion sensor 431 may include an acceleration sensor, a gyroscope, a gyro sensor, a MEMS, a geomagnetic sensor, an inertial sensor (IMIU), an image sensor, an optical sensor, an illumination sensor, a photo sensor, an infrared sensor, a color sensor, a depth sensor, or an electromagnetic wave sensor.

According to various embodiments, the HMD sound sensor 432 may acquire a signal corresponding to sound input from the outside. For example, the HMD sound sensor 432 may be a microphone.

According to various embodiments, the HMD controller 440 may control the operation of the HMD device 400.

According to various embodiments, the HMD display 450 may output visual information to the user. For example, the HMD display 450 may output an image for the VR. For example, the HMD display 450 may output an image for 3D VR.

According to various embodiments, the HMD display 450 may be provided as an image output device such as a liquid crystal display (LCD), electronic paper, an LED display, an organic LED (OLED) display, a curved display, or a stereoscopic display (a 3D display using binocular parallax).

According to various embodiments, the HMD speaker 460 may output auditory information. For example, the HMD speaker 460 may be provided as an audio device such as a tuner, a playback device, an amplifier, or a speaker.

Figure 6A:
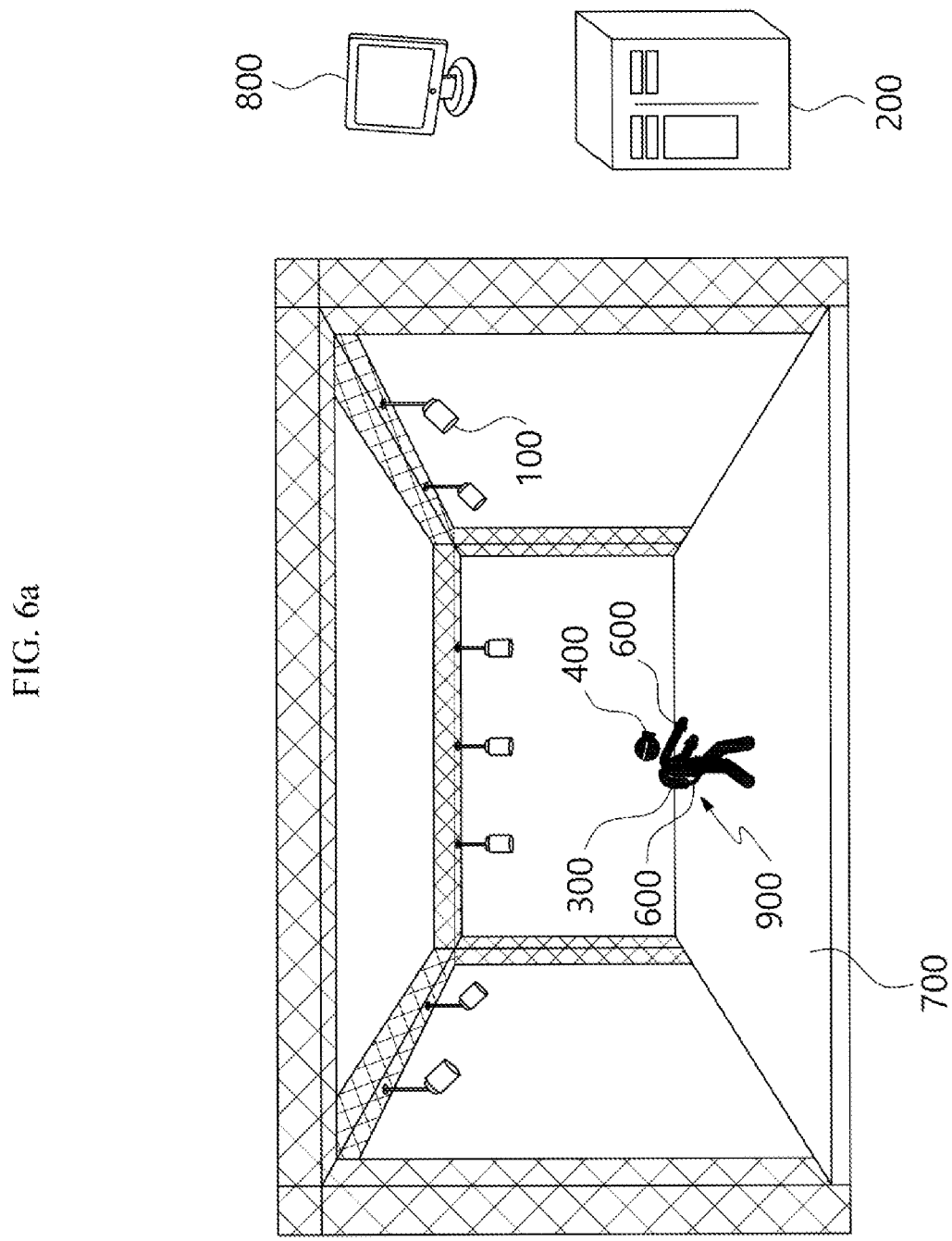
FIG. 6A is a diagram illustrating implementation of the virtual reality control system according to various embodiments.
Figure 6B:
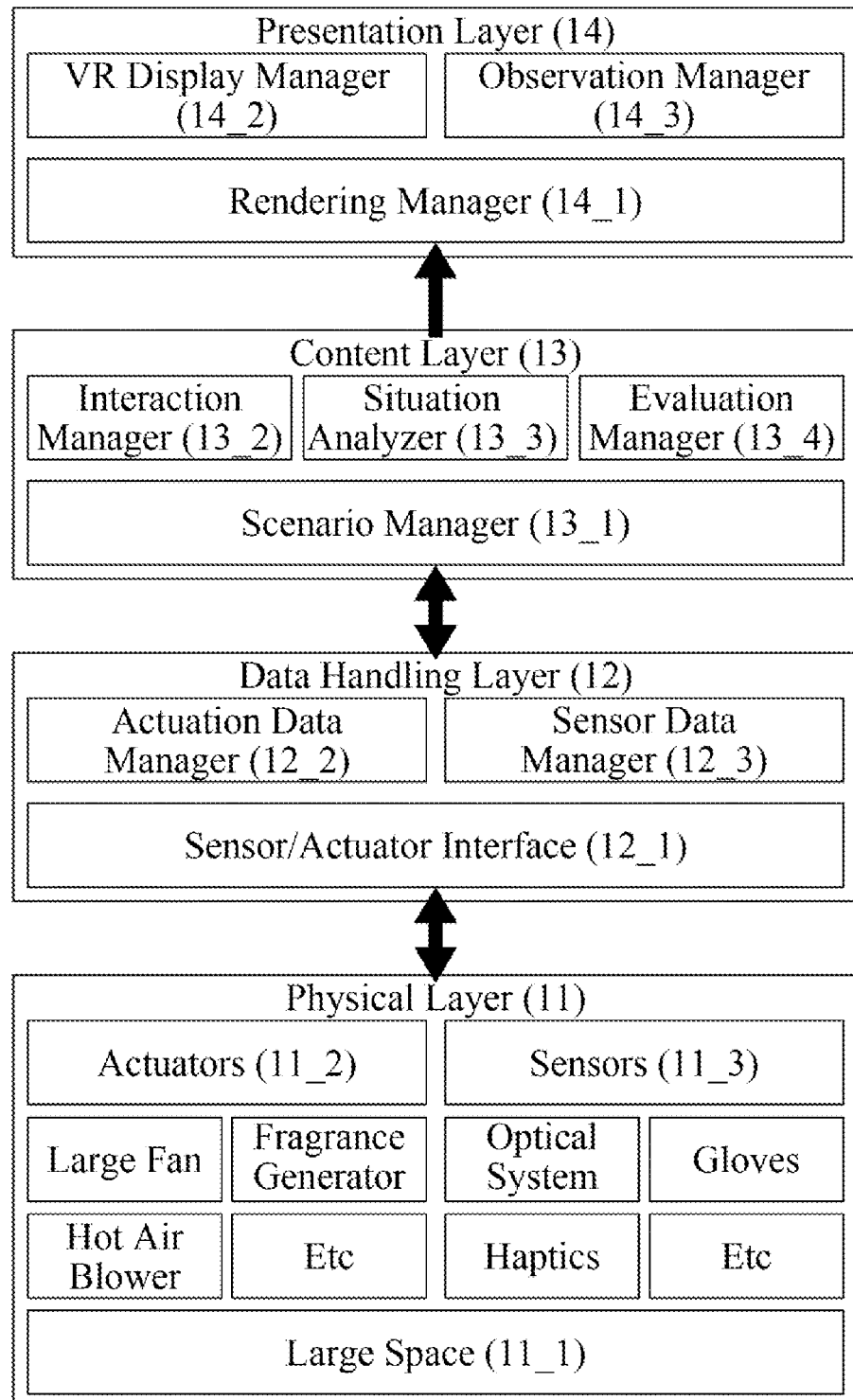
FIG. 6B is a diagram illustrating a hierarchical architecture of the virtual reality control system according to various embodiments.
Figure 6C:
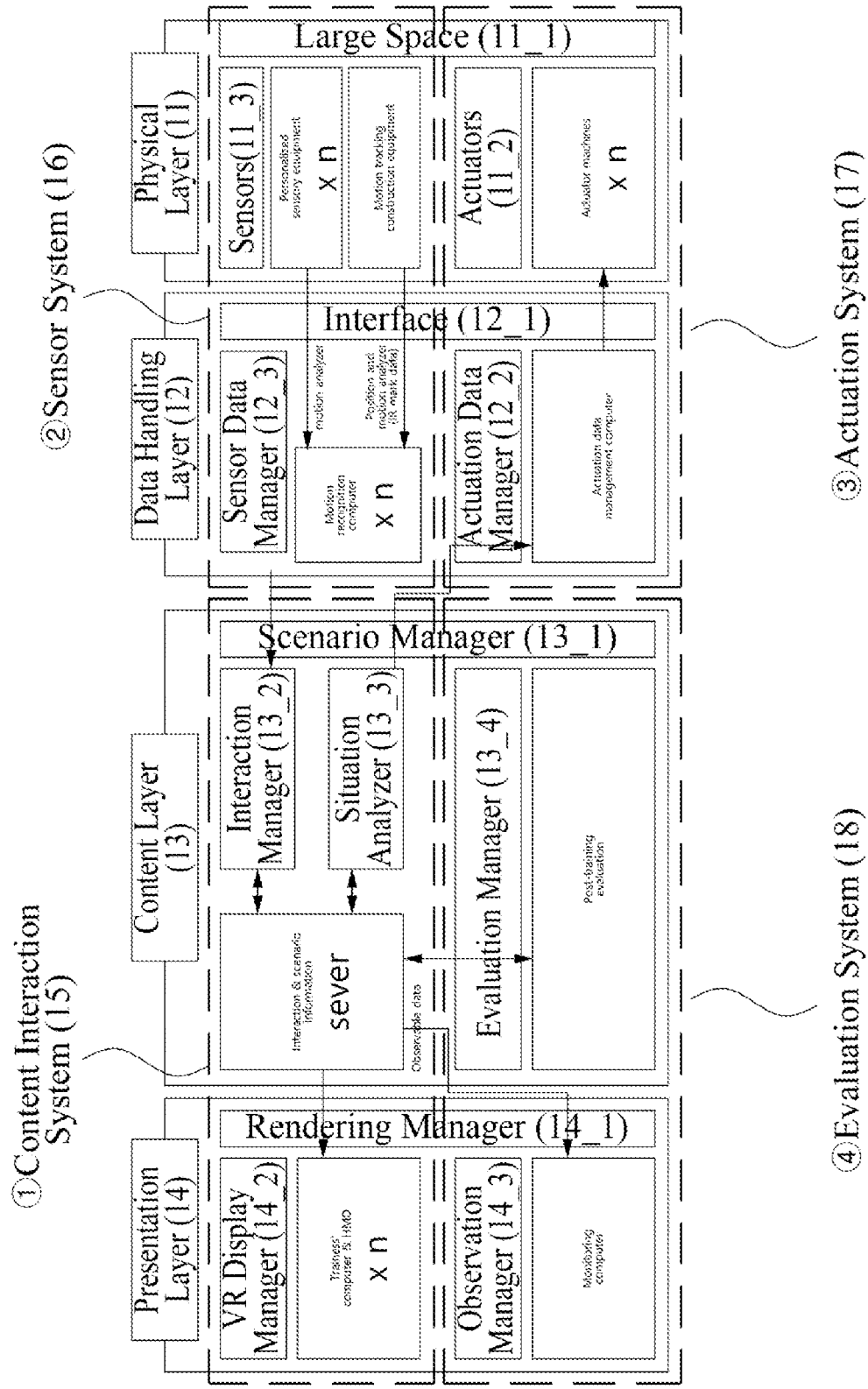
FIG. 6C is a diagram illustrating design of the virtual reality control system according to various embodiments.

FIG. 6A is a diagram illustrating implementation of the VR control system according to various embodiments. FIG. 6B is a diagram illustrating a hierarchical architecture of the VR control system according to various embodiments. FIG. 6C is a diagram illustrating design of the VR control system according to various embodiments.

According to various embodiments, an operation of the VR control system, which will be described with reference to FIGS. 6A, 6B, and/or 6C, may include an operation performed by the electronic device 1000, which will be described with reference to FIG. 9, (or the server 200 and/or the auxiliary computing device 300). Referring to FIG. 6A, the VR control system 10 may be implemented to provide a tracking area 700 for a virtual experience to at least one user 900. According to various embodiments, the tracking area 700 is a physical space and may be a large space in which disaster training content of the present disclosure can be executed.

According to various embodiments, at least one among the auxiliary computing device 300, the HMD device 400, the input device 500, and the active marker 600 may be provided to the user 900 in the tracking area 700.

According to various embodiments, the HMD device 400 and the active marker 600 may be provided to a body part of the user 900.

According to various embodiments, a marker M may be provided to a target which is provided to the user 900. For example, when the target is the HMD device 400, the input device 500, and/or the active marker 600, markers M with different patterns may be provided to the HMD device 400, the input device 500, and/or the active marker 600.

According to various embodiments, a pattern in which the marker M is provided will be described below with reference to FIG. 7.

According to various embodiments, at least one detecting device 100 may be provided in the tracking area 700. For example, as shown in FIG. 6, a plurality of detecting devices 100 may be provided in the tracking area 700.

According to various embodiments, as shown in FIG. 6, a frame for installing the detecting devices 100 may be provided around the tracking area 700. According to various embodiments, the detecting devices 100 may be provided at predetermined intervals around the tracking area 700. In addition, the detecting device 100 may be provided to be spaced apart from the ground by a predetermined height. In addition, the detecting device 100 may be provided to be directed to the tracking area 700. The detecting device 100 according to various embodiments may be fixed to and installed at a pre-installed frame.

According to various embodiments, the detecting device 100 may acquire detecting information on the tracking area 700. For example, the sensor module 120 included in the detecting device 100 may acquire detecting information on at least a portion of the tracking area 700.

According to various embodiments, the detecting device 100 may provide the detecting information to the server 200 or the auxiliary computing device 300. However, the present disclosure is not limited thereto, and the detecting device 100 may provide the detecting information to the electronic device 1000 which is described with reference to FIG. 9 and may be expressed as the server 200 and/or the auxiliary computing device 300. For example, the detecting device 100 may provide the detecting information acquired by the sensor module 120 to the server 200. Thus, the server 200 may acquire real-time location information of the target on the basis of the detecting information.

As shown in FIG. 6, when a plurality of detecting devices 100 are provided in the tracking area 700, the server 200 or the auxiliary computing device 300 may acquire pieces of detecting information from the plurality of detecting devices 100 and may acquire current location information of the target on the basis of the acquired pieces of detecting information.

According to various embodiments, the server 200 and/or the auxiliary computing device 300 may acquire virtual location information on at least one target on the basis of pieces of location information of targets. For example, the auxiliary computing device 300 may acquire coordinates in the VR corresponding to coordinates included in location information of the user 900 in reality as virtual location information of a character corresponding to the user 900 in the VR.

According to various embodiments, the server 200 may provide the auxiliary computing device 300 with at least one of the location information and the virtual location information on the target. According to various embodiments, the auxiliary computing device 300 may calculate virtual location information on the basis of the acquired location information. In addition, the auxiliary computing device 300 may acquire a virtual reality image on the basis of the virtual location information.

For example, the auxiliary computing device 300 may build VR required for a virtual experience using a program or application stored in the auxiliary computing memory 320 and acquire a view range in the VR on the basis of the acquired virtual location information. For example, the auxiliary computing device 300 may acquire the virtual reality image based on the view range within the VR.

According to various embodiments, the auxiliary computing device 300 may provide the virtual reality image to the HMD device 400. The HMD device 400 may output the virtual reality image to the user 900. In addition, the server 200 may provide the virtual reality image to a monitoring display 800.

According to various embodiments, the server 200 may provide the virtual reality image, which is acquired from the auxiliary computing device 300, to the monitoring display 800 connected to the server 200. Alternatively, when the server 200 is connected to a plurality of auxiliary computing devices 300, the server 200 may acquire a virtual reality image from at least one auxiliary computing device 300 among the plurality of auxiliary computing devices 300 and provide the acquired virtual reality image to the monitoring display 800 connected to the server 200.

For example, the server 200 may select an auxiliary computing device 300, from which a VR image is acquired, through the server input device 230 among the auxiliary computing devices 300 connected to the server 200 and provide the monitoring display 800 with the VR image acquired from the selected auxiliary computing device 300.

In addition, the server 200 may acquire virtual location information from the auxiliary computing device 300 and acquire a VR image on the basis of the acquired virtual location information and a preset virtual camera position in the VR. In addition, the server 200 may provide the acquired VR image to the monitoring display 800 connected to the server 200. According to various embodiments, the monitoring display 800 may output the VR image acquired from the server 200.

According to various embodiments, the active marker 600 may be provided to be connected to at least one among the server 200, the auxiliary computing device 300, and the HMD device 400. In addition, the active marker 600 may be provided on a body part of the user 900. For example, the active marker 600 may be provided on at least one among the back of hand, a waist, and a wrist of the user 900.

According to various embodiments, the server 200 may acquire location information of the active marker 600 on the basis of detecting information acquired from the detecting device 100. In addition, the location information of the active marker 600 may include at least one of the location information of the active marker 600 in the tracking area 700 and orientation direction information of the active marker 600.

According to various embodiments, the auxiliary computing device 300 may determine an orientation direction of an object (e.g., a specific part of a character corresponding to the hand of the user 900) corresponding to the active marker 600 in the VR on the basis of the location information on the active marker 600.

According to various embodiments, the auxiliary computing device 300 may acquire a virtual image considering the orientation direction of the object corresponding to the active marker 600. For example, the auxiliary computing device 300 may acquire a virtual image in which the hand of the user 900 corresponding to the active marker 600 is oriented in a direction corresponding to the orientation direction of the active marker 600 in the VR.

Referring to FIG. 6B, an architecture of the VR control system 10 described with reference to FIG. 6A is shown.

According to various embodiments, the VR control system 10 may include a physical layer 11, a data handling layer, a content layer, and/or a presentation layer.

According to various embodiments, the VR control system 10 may use hardware and/or software module so as to support an operation of each layer. According to various embodiments, the electronic device 1000 (or the server 200 or the auxiliary computing device 300) drives the hardware and executes the software module so that operations of the layers of the VR control system 10 may be performed.

According to various embodiments, the physical layer 11 may include a large space 11_1 (e.g., the tracking area 700 of FIG. 6A), an actuator 11_2, and sensors 11_3 (e.g., the detecting device 100 of FIG. 6A, at least one active marker 600, a glove sensor, and a haptic sensor).

According to various embodiments, the physical layer 11 of the VR control system 10 may include the physical sensors 11_3 and/or the actuator 11_2. According to various embodiments, the sensors 11_3 may detect motion of the user 900 (e.g., a trainee), and the user 900 may receive haptic feedback from the actuator 11_2.

According to various embodiments, the physical layer 11 may include the large space 11_1 which is a space of the physical world where the user 900 can freely and naturally walk. A size of the large space 11_1 may be based on the number of users 900. For example, as described with reference to Table 1, a minimum size of the large space 11_1 may be determined depending on the number of users 900. However, in the present disclosure, the size of the large space 11_1 is merely an example and is not limited to the size in Table 1.

TABLE 1

| Size of large space 11_1 | Size of large space 11_1 (unit: m$^2$) | Number of users 900 |
|---|---|---|
| 5 m × 7 m | 35 | ~3 |
| 10 m × 14 m | 140 | ~6 |
| 14 m × 18 m | 252 | ~8 |
| 18 m × 22 m | 396 | ~10 |

According to various embodiments, optical camera sensors (e.g., the sensors 11_3 and the detecting device 100) may be installed in the large space 11_1. The optical camera sensors may interact with rigid body markers or active LED sensors (e.g., the sensors 11_3 and at least one active marker 600) attached to the body of the user 900. The active LED sensor may be attached to the body of the user 900, including at least one of a head, a right hand, a left hand, a waist, a left leg, and a right leg of the user 900. In addition, according to various embodiments, an IMU sensor (e.g., the sensors 11_3) may be used to complement motion tracking of the user 900.

According to various embodiments, the actuator 11_2 may be disposed in the large space 11_1 and started and controlled to provide realistic feedback to the user 900. For example, when a disaster event (e.g., a fire) occurs in VR and the user 900 approaches the hazard (e.g., a fire point), an actuator 11_2 (e.g., a hot air blower) in the large space 11_1 is activated to transfer tactile feedback (e.g., heat) to the user 900.

According to various embodiments, the physical layer 11 may include an interface 12_1, an actuation data manager 12_2, and a sensor data manager 12_3 for communicating with the actuator 11_2 and the sensors 11_3.

According to various embodiments, the data handling layer 12 may connect the physical layer 11 and the content layer 13. For example, the data handling layer 12 may transmit data, which is collected through the sensors 11_3, to the sensor data manager 12_3 through the interface 12_1. The transmitted sensor data may be analyzed by the sensor data manager 12_3 and transmitted to a scenario manager 13_1 of the content layer 13. For example, the sensor data manager 12_3 may analyze raw data of a sensor interface collected from the various sensors 11_3 in the large space 11_1, convert the analyzed raw data into data that can be used in the content layer 13, and then transmit the converted data to the content layer 13. According to various embodiments, the sensor data manager 12_3 converting the sensor data acquired from the sensors 11_3 (a change of location information) will be described below with reference to FIGS. 9 to 13.

According to various embodiments, the data usable in the content layer 13 may include motions (e.g., yaw, pitch, and roll) of the HMD device 400 worn by the user 900, motions (e.g., yaw, pitch, and roll) of the user 900 and an object to which at least one active marker 600 (e.g., the active LED sensor and the rigid body marker) is attached, and locations (x, y, z) of the user 900 and an object to which the tracking device is attached and/or an operation of the input device 500 (an event occurrence signal).

According to various embodiments, the actuation data manager 12_2 may analyze actuation information received from scenario manager 13_1 of the content layer 13, transmit the analyzed actuation information to the actuation data manager 12_2, and transmit the analyzed actuation information to actuator 11_2.

According to various embodiments, the content layer 13 may include the scenario manager 13_1, an interaction manager 13_2, a situation analyzer 13_3, and an evaluation manager 13_4.

According to various embodiments, the content layer 13 may evaluate the progress of content and interaction of the user 900. The content layer 13 may transmit a scenario (e.g., a disaster situation scenario) and content information (e.g., a virtual 3D environment, a non-player character (NPC), and an avatar), which are stored in the server 200, to a rendering manager 14_1 of the presentation layer 14 through the scenario manager 13_1. For example, the scenario manager 13_1 may transmit the scenario and the content information, which are stored in the server 200, to the rendering manager 14_1 of the presentation layer 14. A content change may be transmitted to the rendering manager 14_1 of the presentation layer 14.

According to various embodiments, when the content begins, the content layer 13 may transmit interaction information of the user 900 collected by the interaction manager 13_2 to the situation analyzer 13_3 and transmit content information, which is changed on the basis of the result analyzed by the situation analyzer 13_3, to the rendering manager 14_1. For example, the interaction manager 13_2 may collect the interaction information on a motion of the user 900 for a scenario situation and transmit the collected interaction information to the situation analyzer 13_3.

According to various embodiments, the situation analyzer 13_3 may analyze the motion of the user 900 and the scenario information. Then, the situation analyzer 13_3 may transmit a content change to the rendering manager 14_1. In addition, the situation analyzer 13_3 may transmit operating information for operating the actuator 11_2 to the data handling layer 12. In this case, an example of transmitted data may include a progress direction of the scenario, a command for the actuator 11_2, changes of a guide in the virtual environment (e.g., a visual objects and sound).

According to various embodiments, content the layer 13 may transmit motion information derived through interaction of the user 900 to the data handling layer 12. Additionally, the content layer 13 may transmit the content information and the interaction information of the user 900 to the evaluation manager 13_4 to evaluate activity of the user 900 according to a content evaluation standard.

According to various embodiments, the presentation layer 14 may include the rendering manager 14_1, a VR display manager 14_2, and an observation manager 14_3. According to various embodiments, the presentation layer 14 may convert the content information received from the scenario manager 13_1 into real-time video output data and then transmit the real-time video output data to a VR display device. The presentation layer 14 may record a training progress of an individual user (e.g., the user 900) through the observation manager 14_3.

According to various embodiments, the rendering manager 14_1 may convert the content information of the scenario manager 13_1 into real-time image output data and then transmit the video output to the VR display manager 14_2 and the observation manager 14_3.

According to various embodiments, the VR display manager 14_2 may transmit the real-time image output data of the rendering manager 14_1 to the VR display device (e.g., the HMD device 400) worn by the user 900.

According to various embodiments, the observation manager 14_3 may provide a part for observing a training situation of a selected individual user (e.g., the user 900) from a point of user view or quarter view. In addition, the observation manager 14_3 may record training history in a video format or other recording formats.

Referring to FIG. 6C, the VR control system 10 may be divided into a content interaction system 15, a sensor system 16, an actuation system 17, and/or an evaluation system 18. According to various embodiments, the VR control system 10, which will be described with reference to FIG. 6C, may be understood as reclassifying the operation of each layer of the architecture of the VR control system 10 described with reference to FIG. 6B.

According to various embodiments, the content interaction system 15 may provide various situations to the user 900 (e.g., a trainee) and analyze interaction information acquired through performance of the user. The content interaction system 15 may analyze sensor data acquired from the user 900 and provide a function of allowing the user 900 to freely move in a virtual space and interact with a virtual object. In addition, the content interaction system 15 may allow the scenario to progress on the basis of the interaction performed by the user 900 according to a scenario of a content (e.g., a scenario of a training content). According to various embodiments, when determination of the situation analyzer 13_3 on the movement and interaction of the user satisfies a condition in which the actuator 11_2 can operate, the content interaction system 15 may generate operating information and transmit the operating information to the actuator 11_2. In addition, all situations of all training processes that the user 900 should perform may be displayed through the VR display manager 14_2 of content interaction system 15.

According to various embodiments, the sensor system 16 may collect a motion of the user 900 and spatial information on the large space 11_1. For example, the sensor system 16 may manage motion data of the user 900 from personalized sensors (e.g., the sensors 11_3) such as the HMD device 400, a firearm, and a gloves. In addition, the sensor system 16 may provide motion information of the user 900 through a motion tracking device such as an optical camera (e.g., the detecting device 100). The sensor system 16 may transmit the acquired data to a computer for motion recognition.

According to various embodiments, the actuation system 17 may operate a corresponding actuator (e.g., the actuator 11_2) in the real physical world when sensory feedback is needed in a virtual environment.

According to various embodiments, the evaluation system 18 may observe the training progress of the user 900 and, simultaneously, evaluate the training process in conjunction with the content interaction system 15. The evaluation system 18 may evaluate whether the user 900 complies with an operating procedure of the VR control system 10 and store data required for reviewing a progress situation of the user 900.

According to various embodiments, the VR control system 10 may be optimized to provide a variety of large-scale disaster response training experiences. According to various embodiments, the system may be configured differently according to a scenario, such as the types of sensors 11_3, the type of actuator 11_2, a scenario type, a number of users, a size of the large space 11_1, and/or a device type.

For example, when the scenario type is a training scenario for a chemical leak, the size of large space 11_1 may be 12 m×12 m, a number of users may be six, the sensors 11_3 may be an optical camera sensor, a gyro sensor, an IMU sensor, and a glove sensor, and/or the actuator 11_2 may be a fan.

For example, when the scenario type is a fire extinguishing training scenario, the size of large space 11_1 may be 18 m×18 m, a number of users may be ten, the sensors 11_3 may be an optical camera sensor, an IMU sensor, and a gyro sensor, the actuator 11_2 may be a heating wire seat, a hot air blower, wind pressure equipment (nozzle), or a 3-axis simulator, and/or a user portable device may be a nozzle, a fire extinguisher, an oxygen tank, or a fireproof suit.

According to various embodiments, the disclosed system configuration is not limited to the described content and may additionally include various devices or omit some devices as necessary.

Figure 7:
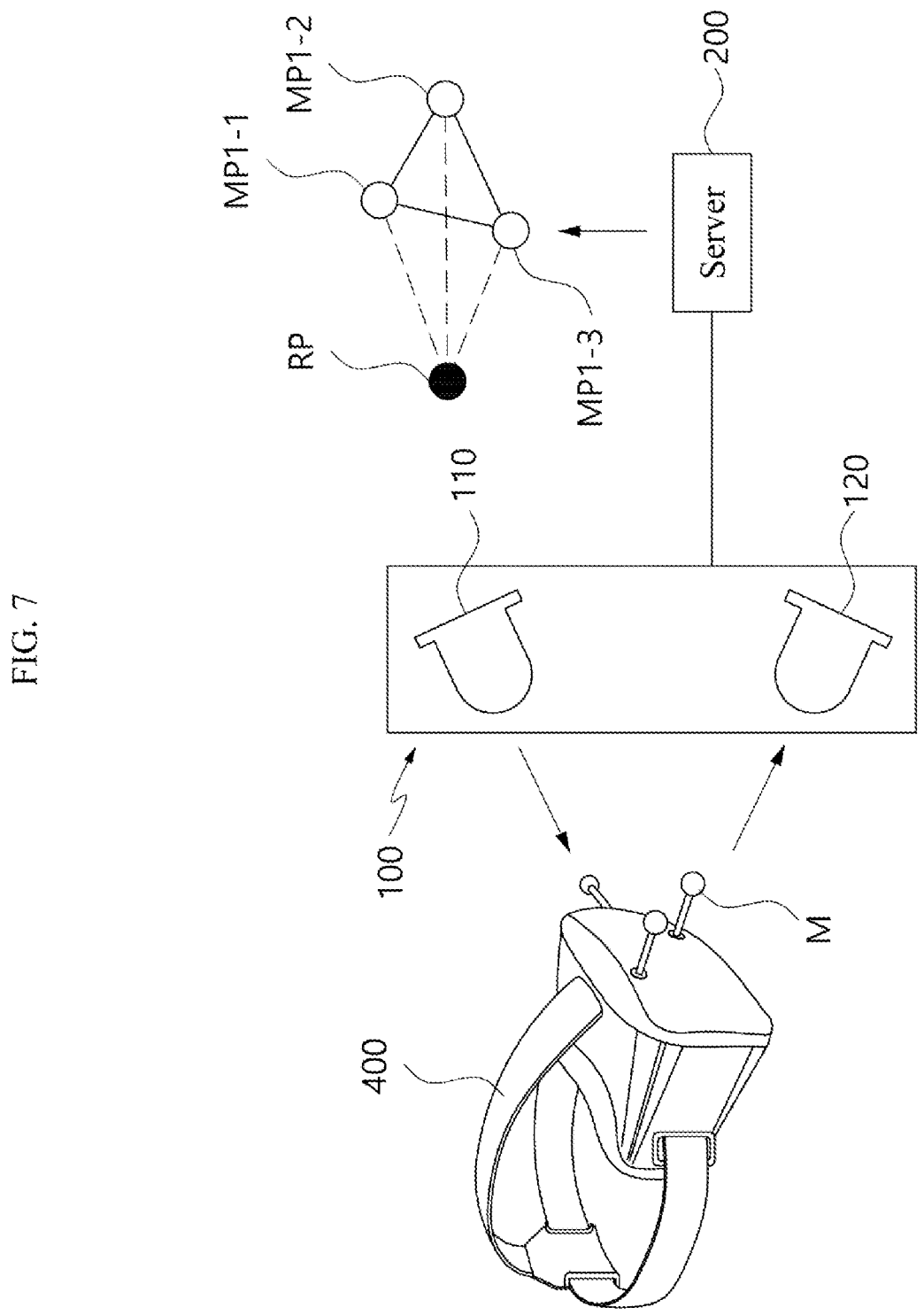
FIG. 7 is a diagram illustrating a target tracking method according to various embodiments.

FIG. 7 is a diagram illustrating a target tracking method according to various embodiments.

Referring to FIG. 7, the target tracking method may acquire information on a target using an externally provided sensor and determine a location of the target on the basis of the acquired information on the target.

Hereinafter, an example in which the target is the HMD device 400 will be described with reference to FIG. 7.

Referring to FIG. 7, a marker M for identifying the target may be provided to the target. The marker M may be provided to the target to provide a reference for identifying and tracking the target.

According to various embodiments, in order to track the target, it is necessary to identify the target from and a non-target component, and the marker M is provided to the target so that the target may be identified. In addition, when a plurality of targets are provided, it is necessary to identify each target, and to this end, a marker M provided to one target may be provided to be distinguishable from markers M provided to other targets. For example, a marker M provided to one target may be provided in a different pattern from markers M provided to other targets.

According to various embodiments, patterns may include a pattern formed by providing a plurality of markers M at different positions and a pattern with various meanings, such as an optical pattern provided to one display panel. For example, the pattern may be formed by marker coordinates of the marker M.

According to various embodiments, three markers M may be tracked by the detecting device 100 and first marker coordinates MP1-1, second marker coordinates MP1-2, and third marker coordinates MP1-3 may be acquired as detecting information, and the first to third marker coordinates MP1-1 to MP1-3 may form a triangular pattern. In addition, the marker M may be provided as one of a passive marker which reflects or absorbs an optical signal transmitted from the light-emitting module 110 and an active marker capable of transmitting an optical signal itself.

According to various embodiments, the passive marker may include a three-dimensional model to which a light reflective material is attached, paper on which a recognizable code is printed, and a reflective tape. In addition, the active marker may include an LED module, and a radio wave generator.

According to various embodiments, at least one marker M may be provided to a target. For example, when the VR control system 10 tracks a location of only one target, only one marker M may be provided to the target. In addition, even when the VR control system 10 tracks the location of only one target, a plurality of markers M may be provided to the target.

According to various embodiments, when the VR control system 10 tracks locations of a plurality of targets, in order to identify each of the plurality of targets, a plurality of markers M may be provided to one target to form a pattern. For example, when the HMD device 400 and the active marker 600 are provided as two targets whose locations are tracked by the VR control system 10, a marker M may be provided to the HMD device 400 as a first pattern, and a marker M may be provided to the active marker 600 as a second pattern. In addition, when the input device 500 is further included as a target whose location is tracked by the VR control system 10, a marker M may be provided to the input device 500 as a third pattern.

According to various embodiments, the first pattern, the second pattern, and the third pattern are different from each other, and during location tracking, when the first pattern is detected, the first pattern may be identified as the HMD device 400, and when the second pattern is detected, the second pattern may be identified as the active marker 600, and when the third pattern is detected, the third pattern may be identified as the input device 500.

As described above, when the plurality of targets are provided, it has been described that the markers M, which are provided to the plurality of targets, are each provided to form a pattern so as to identify each pattern, but the present disclosure is not limited thereto, and even when one target is provided, the markers M provided to the one target may form a pattern.

According to various embodiments, the pattern of the marker M provided to the target may also be used to identify the user 900. For example, the first pattern may be identified as the HMD device 400 worn by a first user, the second pattern may be identified as the active marker 600 worn by the first user, and the third pattern may be identified as the input device 500 worn by the first user. In addition, a fourth pattern may be identified as an HMD device worn by a second user, and a fifth pattern may be identified as an active marker worn by the second user.

According to various embodiments, to describing the tracking of a target, the server 200 may acquire information on the target from the detecting device 100 and acquire detecting information on a location of the target on the basis of the required information. In addition, the server 200 may calculate location information on the target on the basis of the detecting information.

According to various embodiments, to describe a technology in which the detecting device 100 provides the information on the target to the server 200, the light-emitting module 110 of the detecting device 100 may transmit a signal to at least a portion of the tracking area 700. For example, when the light-emitting module 110 is an infrared LED, the light-emitting module 110 may transmit an infrared signal to at least a portion of the tracking area 700.

According to various embodiments, the sensor module 120 may provide information acquired from the outside to the server 200. For example, when the sensor module 120 is a camera, the sensor module 120 may provide an image signal acquired from the outside to the server 200.

Although only one sensor module 120 is shown in FIG. 7, the present disclosure is not limited thereto, and as described above in FIG. 6, a plurality of sensor modules 120 may be provided. In addition, each of the plurality of sensor modules 120 may provide the acquired information to the server 200.

According to various embodiments, the server 200 may determine a location of the target on the basis of the information acquired from the sensor module 120. For example, the server 200 may determine whether information on the marker M is included in the information acquired from the sensor module 120. In addition, when the information on the marker M is included in the information acquired from the sensor module 120, the server 200 may identify the target on the basis of a pattern of the marker M.

For example, when a first pattern is included in the information acquired from the sensor module 120, the server 200 may identify the target as the HMD device 400.

According to various embodiments, a plurality of patterns may be included in information acquired from one sensor module 120, and the server 200 may identify the plurality of patterns. These patterns may be pre-stored in the server 200, and when the pre-stored pattern is identified on the basis of the acquired information, the server 200 may determine that the pattern is present and identify a target corresponding to the pattern.

According to various embodiments, the server 200 may determine a location of the target on the basis of the information acquired from the sensor module 120. In various embodiments, a representative point RP may be set to each pattern pre-stored in the server 200. The representative point RP may be a point representing the pattern. The representative point RP may be present out of the pattern. For example, the representative point RP may be set to a point that is a predetermined distance away from a plane formed by first marker coordinates MK1-1, second marker coordinates MK1-2, and third marker coordinates MK1-3.

According to various embodiments, when a pattern through a plurality of markers M is provided, coordinate information on the plurality of markers M included in the pattern is acquired, and the server 200 may acquire a representative point RP representing the pattern as location information on the target to which the pattern is provided. Thus, the server 200 may acquire the location information on the target, thereby tracking the target.

The location tracking of a target according to various embodiments is not limited to the above-described method, and various location tracking methods may be used according to selection.

According to various embodiments, when the sensor module 120 is provided as an image sensor, the sensor module 120 may acquire an image of the outside and acquire the location information on the target on the basis of the acquired image. For example, when the sensor module 120 shown in FIG. 7 is provided to the HMD device 400, the sensor module 120 may be provided on one side of the HMD device 400 and oriented from an inside of the HMD device 400 to the outside to acquire image information on the outside of the HMD device 400. In addition, the HMD device 400 may provide the acquired image information to the auxiliary computing device 300.

According to various embodiments, the HMD device 400 may provide the image information to the auxiliary computing device 300 at a predetermined period. For example, the HMD device 400 may provide the image information to the auxiliary computing device 300 at the same period as the acquiring of the image information through the sensor module 120.

According to various embodiments, the auxiliary computing device 300 may acquire at least one feature point from the acquired image information. In addition, the auxiliary computing device 300 may acquire an object included in the image information as a feature point.

According to various embodiments, the auxiliary computing device 300 may acquire an object with a predetermined size or more among objects included in the image information as a feature point. For example, the auxiliary computing device 300 may identify objects included in the image information and acquire an object with a predetermined size or more among the identified objects as a feature point. In addition, the auxiliary computing device 300 may determine a size of an object on the basis of the number of pixels occupied by the object included in the image information.

According to various embodiments, the auxiliary computing device 300 may acquire a preset type object among the objects included in the image information as a feature point. For example, when a ball-type object is preset, the auxiliary computing device 300 may acquire ball-type objects, such as a baseball, a soccer ball, and a basketball, included in the image information as feature points.

According to various embodiments, the auxiliary computing device 300 may acquire a marker included in the image information as a feature point. The auxiliary computing device 300 may identify markers, such as a barcode and a quick response (QR) code, included in the image information and acquire the markers as feature points. In addition, the auxiliary computing device 300 a determine a location of the feature point included in the image information.

According to various embodiments, the auxiliary computing device 300 may determine at least one of a location change and a size change of the feature point on the basis of pieces of image information acquired from the HMD device 400. The auxiliary computing device 300 may determine a movement direction and a movement distance of the HMD device 400 on the basis of a direction of the location change, a location variance, and a size variance of the feature point. In addition, the auxiliary computing device 300 may determine a movement direction and a movement distance of the active marker 600 on the basis of the direction of the location change, the location variance, and the size variance of the feature point.

For example, the auxiliary computing device 300 may determine the location change of the feature point on the basis of the pieces of image information acquired from the HMD device 400. For example, the auxiliary computing device 300 may determine the movement direction and the movement distance of the HMD device 400 on the basis of the location variance of the feature point.

According to various embodiments, the auxiliary computing device 300 may determine the movement direction and the movement distance of the HMD device 400 on the basis of the direction of the location change, the location variance, and the size variance of the feature point.

As one example, the auxiliary computing device 300 compares a location of a feature point included in first image information acquired at a first time point with a location of a feature point included in second image information acquired at a second time point that is later than the first time point, and as the comparison result, when the location of the feature point in the first image information moves to the right in the second image information, the auxiliary computing device 300 may determine that the HMD device 400 is moved to the left.

According to various embodiments, the auxiliary computing device 300 may determine a movement distance of a feature point when a location of the feature point is changed. For example, the auxiliary computing device 300 may determine the movement of the feature point on the basis of the number of pixels between the location of the feature point in the first image information and the location of the feature point in the second image information.

For example, the auxiliary computing device 300 may determine the movement distance of the feature point on the basis of coordinates of the feature point in the first image information and coordinates of the feature point in the second image. In addition, for example, the auxiliary computing device 300 may determine the movement direction and the movement distance of the HMD device 400 on the basis of the size variance.

According to various embodiments, the auxiliary computing device 300 compares the size of the feature point included in the first image information acquired at the first time point with the size of the feature point included in the second image information acquired at the second time point that is later than the first time point, and as the comparison result, when the location of the feature point in the first image information moves to the right in the second image information, the auxiliary computing device 300 may determine that the HMD device 400 is moved to the left. Thus, the auxiliary computing device 300 may track the location of the target on the basis of a relative location change of the target from a preset initial location.

According to various embodiments, the auxiliary computing device 300 may determine a movement direction and a movement distance of the active marker 600 by performing an operation similar to the determination of the movement direction and the movement distance of the HMD device 400. Therefore, a description of the operation of the auxiliary computing device 300 for determining the movement direction and the movement distance of the active marker 600 may be omitted.

Figure 8:
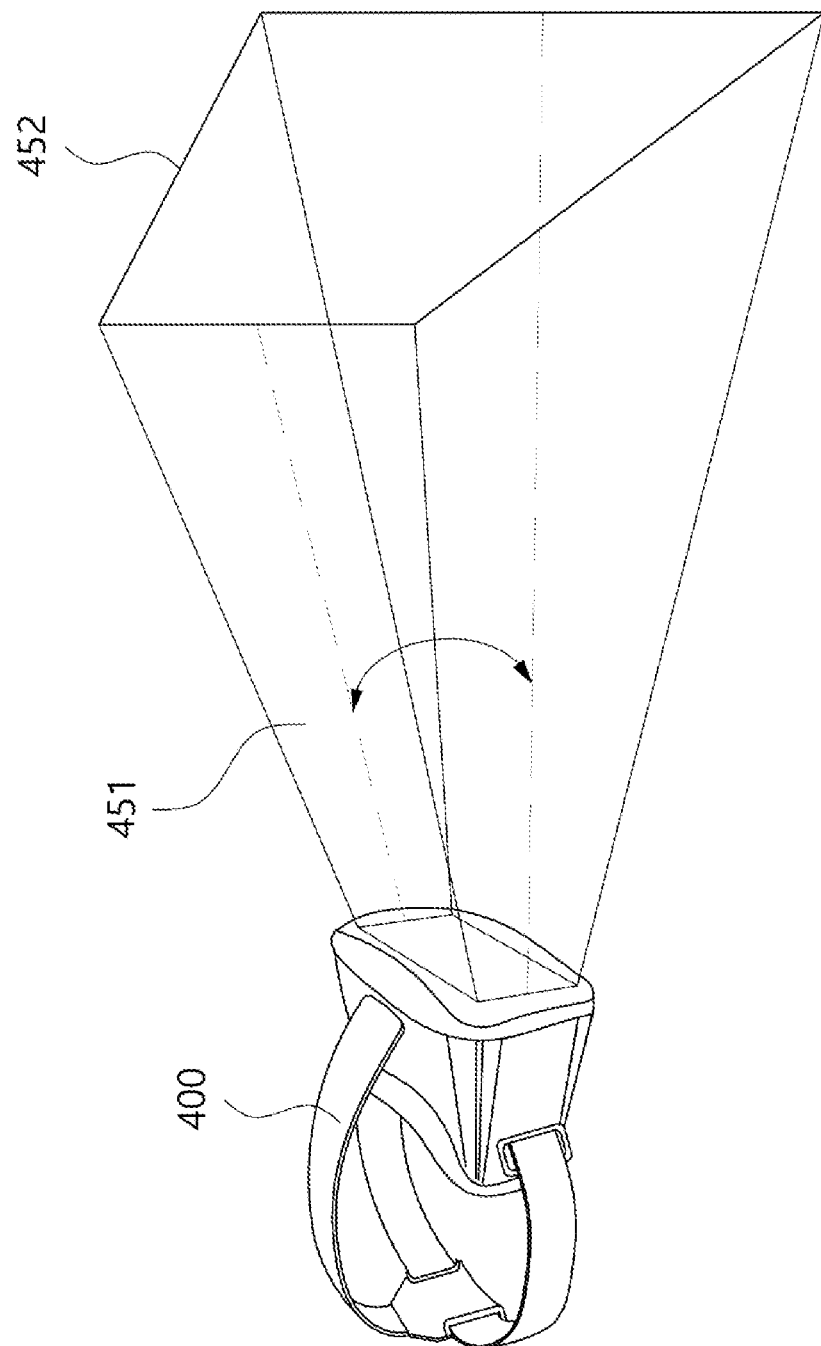
FIG. 8 is a diagram illustrating that a virtual reality image is output through the HMD device according to various embodiments.

FIG. 8 is a diagram illustrating that a VR image 452 is output through the HMD device 400 according to various embodiments.

Referring to FIG. 8, the VR control system 10 may provide a VR image 452 for at least a portion of VR to the user 900 through the HMD device 400.

According to various embodiments, the VR image 452 is provided to allow the user 900 to experience virtual reality through the HMD device 400 and may be construed as a plurality of image frames implemented as images of VR or an image frame at a specific moment.

According to various embodiments, the VR image 452 may include a character or virtual object displayed on the basis of virtual location information. In this case, the virtual location information may be calculated on the basis of the location information including at least one of the location coordinates and the orientation direction of the target in reality. For example, the location information may be location coordinates of a target placed in the tracking area 700.

According to various embodiments, the server 200 may store coordinate values for the tracking area 700 in advance. For example, the server 200 may store a coordinates system for the tracking area 700 in advance. The coordinate system may be at least one among a plane coordinate system, an orthogonal coordinates system, a polar coordinate system, a spatial coordinate system, a cylindrical coordinate system, and a spherical coordinate system.

According to various embodiments, the server 200 may acquire a coordinate value of the target in the tracking area 700 on the basis of the detecting information and the coordinate system for the tracking area 700. In addition, the server 200 may acquire the acquired coordinate values of the target in the tracking area 700 as location information.

For example, when the detecting information is an infrared image, the server 200 may acquire a coordinate value of the marker in tracking area 700 on the basis of the location of the marker corresponding to the target in the infrared image and an installation location of the detecting device 100 which provides the infrared image. In addition, the server 200 may determine a pattern formed by the marker on the basis of the coordinate value of the marker in the tracking area 700 and identify an object corresponding to the pattern formed by the marker. In addition, the server 200 may acquire a representative point RP of the target on the basis of the pattern formed by the marker and the coordinate value of the marker in the tracking area 700 and acquire a coordinate value of the representative point RP of the target as the location information of the target.

According to various embodiments, the server 200 may provide the location information to the auxiliary computing device 300. According to various embodiments, the auxiliary computing device 300 may store coordinate values for VR in advance. For example, the auxiliary computing device 300 may store a coordinates system for VR in advance. The coordinate system may be at least one among a plane coordinate system, an orthogonal coordinates system, a polar coordinate system, a spatial coordinate system, a cylindrical coordinate system, and a spherical coordinate system.

According to various embodiments, the auxiliary computing device 300 may acquire a coordinate value of the target in VR on the basis of the location information and the coordinate system for VR. In addition, the auxiliary computing device 300 may acquire the acquired coordinate value of the target in VR as virtual location information. For example, the auxiliary computing device 300 may acquire a coordinate value in VR, which corresponds the coordinate value included in the location information and acquire the acquired coordinate value in VR as the virtual location information.

According to various embodiments, the auxiliary computing device 300 may acquire the VR image 452, which is to be output to the user 900, on the basis of the virtual location information.

According to various embodiments, the auxiliary computing device 300 may acquire the virtual location information of the HMD device 400 as virtual location information of a virtual camera and acquire a view range 451 of the virtual camera on the basis of virtual location information and an orientation direction of the virtual camera.

According to various embodiments, the auxiliary computing device 300 may acquire the orientation direction of the virtual camera on the basis of the orientation direction included in the location information of the HMD device 400.

According to various embodiments, the auxiliary computing device 300 may acquire a predetermined area in the orientation direction of the virtual camera as the view range 451 of the virtual camera. In this way, by acquiring the view range 451 of the virtual camera on the basis of the location information of the HMD device 400, the view of the character corresponding to the user 900 in VR may be changed according to the movement of the user 900, and the view of the character may be reflected in the VR image 452 provided to the user 900.

Alternatively, the view range 451 of the virtual camera may be acquired not only by the virtual location information of the HMD device 400 but also by specific virtual location information in VR.

According to various embodiments, the auxiliary computing device 300 may acquire the VR image 452 corresponding to the view range 451 of the virtual camera in VR.

According to various embodiments, the auxiliary computing device 300 may provide the VR image 452 to the HMD device 400.

According to various embodiments, the HMD device 400 may output the acquired VR image 452 to the user 900 through the HMD display 450.

Figure 9:
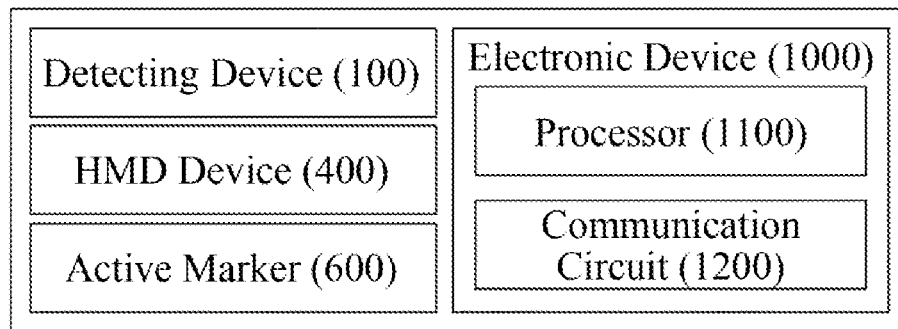
FIG. 9 is a block diagram illustrating the virtual reality control system according to various embodiments.

FIG. 9 is a block diagram illustrating the VR control system according to various embodiments.

Referring to FIG. 9, the VR control system 10 may include the detecting device 100, the HMD device 400, the active marker 600, and/or the electronic device 1000. According to various embodiments, the electronic device 1000 may represent a component corresponding to the server 200 and/or the auxiliary computing device 300, which is described with reference to FIGS. 1 to 8. Accordingly, the operation of the electronic device 1000 below may be construed as the operation of the server 200 or the auxiliary computing device 300. In addition, the operation of the server 200 or the auxiliary computing device 300 may be construed as the operation of electronic device 1000.

The above-described components may be operatively or electrically connected to each other. Components of the VR control system 10 shown in FIG. 9 are examples, and some of the components may be modified, deleted, or added.

According to various embodiments, the electronic device 1000 may include at least one processor 1100 and at least one communication circuit 1200.

In various embodiments, the processor 1100 may execute software (e.g., a program) to control at least one other component (e.g., a hardware or software component) of the electronic device 1000 connected to the processor 1100 and may perform processing or calculation of a variety of data. According to various embodiments, as at least a part of data processing or computation, the processor 1100 may store a command or data received from another component (e.g., the communication circuit 1200) in a volatile memory, process the command or data stored in the volatile memory, and store the result data in a non-volatile memory. According to one embodiment, the processor 1100 may include at least one among a CPU, a GPU, a micro controller unit (MCU), a sensor hub, a supplementary processor, a communication processor, an application processor, an application specific integrated circuit (ASIC), a field programmable gate arrays (FPGA), and a neural processing unit (NPU) and have a plurality of cores. According to various embodiments, the processor 1100 may include a main processor (e.g., a CPU) or a supplementary processor capable of operating independently or together the main processor (e.g., a GPU, an NPU, an image signal processor, a sensor hub processor, or a communication processor). For example, when the electronic device 1000 includes a main processor and a supplementary processor, the supplementary processor may be set to use less power than the main processor or may be specialized for a designated function. The supplementary processor may be implemented separately from the main processor or as a part of the main processor.

According to various embodiments, the electronic device 1000 may include the communication circuit 1200. In various embodiments, the communication circuit 1200 may establish a direct (e.g., wired) or wireless communication channel between the electronic device 1000 and external electronic devices (e.g., the detecting device 100 and the HMD device 400) and support communication through the established communication channel. The communication circuit 1200 may operate independently from the processor 1100 and include one or more communication processors for supporting direct (e.g., wired) communication or wireless communication. According to one embodiment, the communication circuit 1200 may include a wireless communication module (e.g., a cellular communication module, a short-range wireless communication module, or a global navigation satellite system (GNSS) communication module) or a wired communication module (e.g., a local area network (LAN) communication module or power line communication module). Various types of communication modules may be integrated into one component (e.g., a single chip) or implemented as a plurality of separate components (e.g., a plurality of chips).

According to various embodiments, the processor 1100 may transmit and receive a variety of information with at least one component among the detecting device 100, the HMD device 400, and/or the active marker 600 through the communication circuit 1200.

According to various embodiments, the processor 1100 may acquire first location information on a first user in a specific real space identified on the basis of an optical signal for the HMD device through at least some of a plurality of detecting devices related to the electronic devices 1000 and disposed in the specific real space. For example, the processor 1100 may acquire the first location information of the user 900 in the tracking area 700 through the communication circuit 1200 on the basis of an optical signal for the HMD device 400 worn on a body of the user 900 through at least some of the plurality of detecting devices (e.g., the detecting devices 100) related to the electronic device 1000 and disposed in the tracking area 700.

According to various embodiments, the processor 1100 may acquire second location information on a part of a body of the user 900 identified on the basis of an optical signal for at least one active marker 600 provided to at least a part of the body of the user 900, which is detected through at least some of the plurality of detecting devices. For example, the processor 1100 may acquire second location information on parts of the body of the user 900 (e.g., a hand, a wrist, a waist, and the like) through the communication circuit 1200 on the basis of the optical signal for the active marker 600, which is detected through the detecting devices 100.

According to various embodiments, the present disclosure is not limited to the described examples, and the processor 1100 may acquire location information on various parts of the body of the user 900 through at least one active marker 600 provided to the part of the body of the user 900.

According to various embodiments, the processor 1100 may acquire first virtual location information indicating a virtual location of a character corresponding to the user 900 (e.g., a character 1410 of FIG. 14) on the basis of at least the first location information. For example, the processor 1100 may acquire first virtual location information on a location where the character corresponding to the user 900 is to be displayed in VR, on the basis of the first location information.

According to various embodiments, the processor 1100 may determine whether the first location information and the second location information are included in a first designated range and a second designated range, respectively. For example, the processor 1100 may determine whether first location information based on the HMD device 400 worn on the head of the user 900 is present within a first designated range. For example, the processor 1100 may determine whether second location information based on the active marker 600 provided to at least a part of the body of the user 900 is present within a second designated range.

According to various embodiments, at least one active marker 600 may include a plurality of markers forming a preset pattern. According to various embodiments, the processor 1100 may acquire second location information based on at least one among a plurality of markers included in at least one active marker 600.

According to various embodiments, the first designated range and the second designated range may represent a range of the location information that may be identified after the user 900 wears the HMD device 400 and the active marker 600. That is, based on whether the first location information and the second location information are included in the first designated range and the second designated range, respectively, it may be identified whether the user 900 is ready to use the VR control system 10.

According to various embodiments, on the basis of the determination result in that the first location information and the second location information are included in the first designated range and the second designated range, respectively, the processor 1100 may be set to control a display included in the HMD device 400 (e.g., the HMD display 450 of FIG. 5) to display the character corresponding to the user 900 on the basis of the first virtual location information. For example, on the basis of the determination result in that the first location information and the second location information are included in the first designated range and the second designated range, respectively, the processor 1100 may control the character corresponding to the user 900 to be displayed in the VR image 452.

According to various embodiments, on the basis of the determination result in that the first location information and the second location information are included in the first designated range and the second designated range, respectively, the processor 1100 may display a character in the VR image 452. Accordingly, it is possible to prevent the character corresponding to the user from being unrealistically displayed before the user 900 completes wearing the HMD device 400 and/or the active marker 600. Therefore, the sense of immersion of the user in the VR experience can be improved.

According to various embodiments, when the first location information and the second location information are not included in the first designated range and the second designated range, respectively, the processor 1100 may control the display of the HMD device 400 not to display the character corresponding to the user 900 in the VR image 452 (or to maintain the existing screen).

According to various embodiments, the processor 1100 may control the HMD device 400 to display a virtual object (e.g., a virtual object VO of FIG. 14) within the VR image 452. For example, the processor 1100 may control the display of HMD device 400 to display the virtual object in the vicinity of the character corresponding to the user 900.

According to various embodiments, an example in which the virtual object VO is displayed will be described below with reference to FIGS. 14 to 19.

Figure 10:
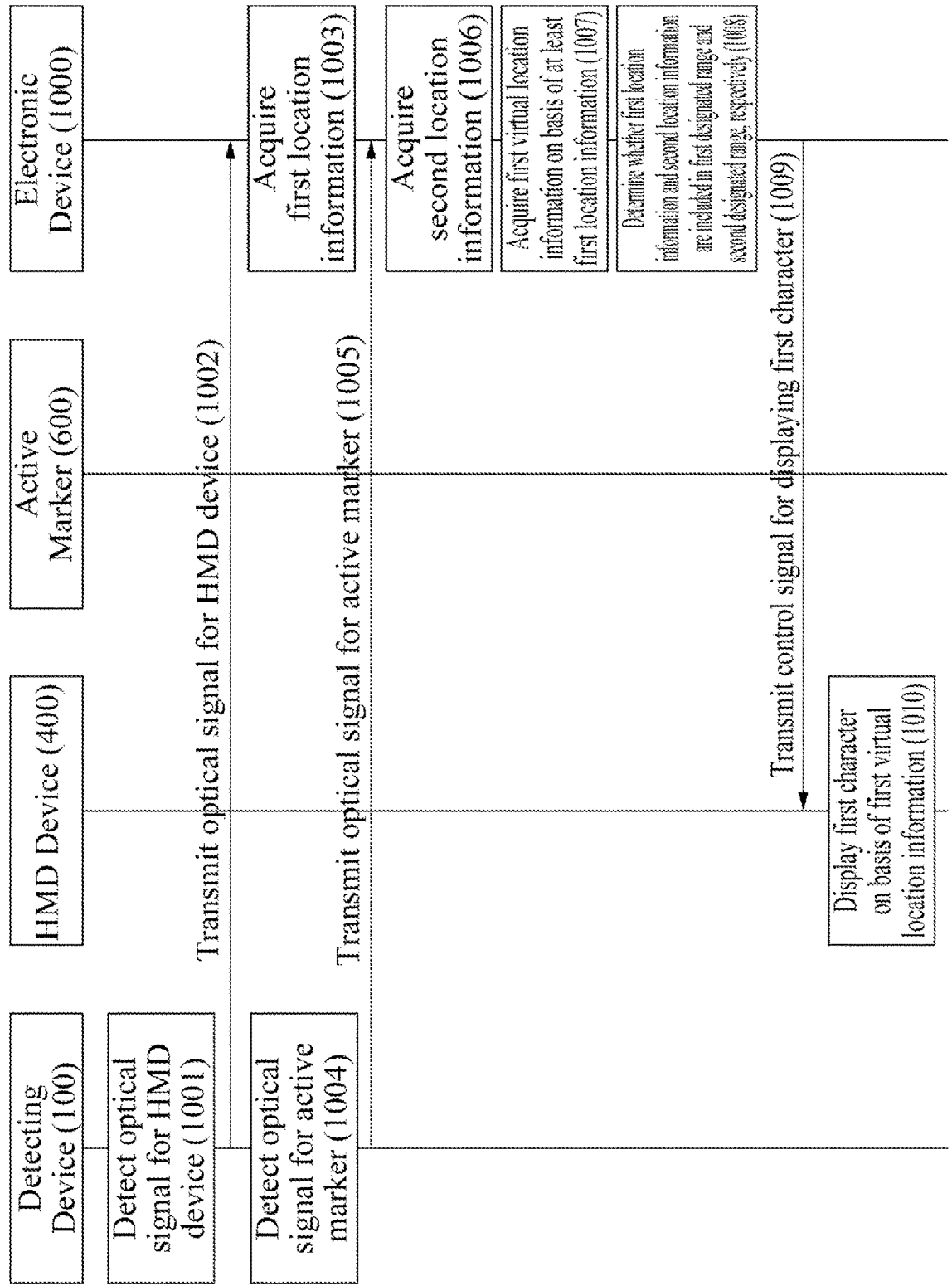
FIG. 10 is a flowchart for describing an operation of an electronic device according to various embodiments.

FIG. 10 is a flowchart for describing an operation of an electronic device according to various embodiments.

Operations, which will be described below, may be performed in combination with each other. In addition, among the operations which will be described below, operations by the electronic device 1000 (e.g., the server 200 and the auxiliary computing device 300 of FIG. 1 and the electronic device 1000 of FIG. 9) may be operations by the processor 1100 of the electronic device 1000 (e.g., the server controller 240 of FIG. 2 and the auxiliary compute controller 340 of FIG. 3)

In addition, "information" described below may be construed as "data" or "signal," and "data" may be understood as a concept including both analog data and digital data.

According to various embodiments, the operations shown in FIG. 10 are not limited to the shown order and may be performed in various orders. In addition, according to various embodiments, more operations may be performed, or at least one operation less than the operations shown in FIG. 10 may be performed.

Referring to FIG. 10, the detecting device 100 may detect an optical signal for the HMD device 400 in operation 1001. For example, the detecting device 100 may detect an optical signal, which is acquired through at least one marker included in the HMD device 400, through the sensing module 120.

According to various embodiments, in operation 1002, the detecting device 100 may transmit the optical signal for the HMD device 400 to the electronic device 1000. For example, the electronic device 1000 may acquire the optical signal for the HMD device 400 through the communication circuit 1200.

According to various embodiments, the electronic device 1000 may acquire first location information on the basis of the optical signal for the HMD device 400 in operation 1003. For example, the electronic device 1000 may acquire the first location information on the user 900 in the tracking area 700 on the basis of the optical signal of the HMD device 400 worn on a part of the body of the user 900.

According to various embodiments, the detecting device 100 may detect an optical signal for the active marker 600 in operation 1004. For example, the detecting device 100 may detect an optical signal emitted from the active marker 600 through the sensing module 120.

According to various embodiments, the detecting device 100 may transmit the optical signal for the active marker 600 to the electronic device 1000 in operation 1005. For example, the electronic device 1000 may acquire the optical signal for the active marker 600 through the communication circuit 1200.

According to various embodiments, the electronic device 1000 may acquire second location information on the basis of the optical signal for the active marker 600 in operation 1006. For example, the electronic device 1000 may acquire second location information on a part of the body part of the user 900 to which the active marker 600 is provided in the tracking area 700 on the basis of the optical signal for at least one active marker 600 provided to the part of the body of the user 900.

According to various embodiments, the electronic device 1000 may acquire first virtual location information on the basis of at least the first location information in operation 1007. For example, the electronic device 1000 may acquire the first virtual location information, which is related to a location where a character corresponding to the user 900 is to be displayed in the VR image 452, on the basis of the first location information.

According to various embodiments, the electronic device 1000 may determine whether the first location information and the second location information are included in a first designated range and a second designated range, respectively, in operation 1008. For example, the electronic device 1000 may set the first designated range and the second designated range, which correspond to completion of the user 900 wearing the HMD device 400 and the active marker 600. The electronic device 1000 may determine whether the first location information and the second location information are included in the first designated range and the second designated range, respectively, to identify whether the user 900 completes the wearing of the HMD device 400 and the active marker 600.

According to various embodiments, the electronic device 1000 may transmit a control signal for displaying a first character corresponding to the user 900 to the HMD device 400 in operation 1009. For example, on the basis of the first location information and the second location information being included in the first designated range and the second designated range, respectively, the electronic device 1000 may transmit a control signal to the HMD device 400 through the communication circuit 1200 to display the character corresponding to the user 900.

According to various embodiments, the HMD device 400 may display the first character on the basis of the first virtual location information in operation 1010 on the basis of the control signal acquired from the electronic device 1000. For example, the HMD device 400 may provide the VR image 452, in which the first character is displayed, to the user 900 through the HMD display 450 on the basis of the first virtual location information.

Figure 11:
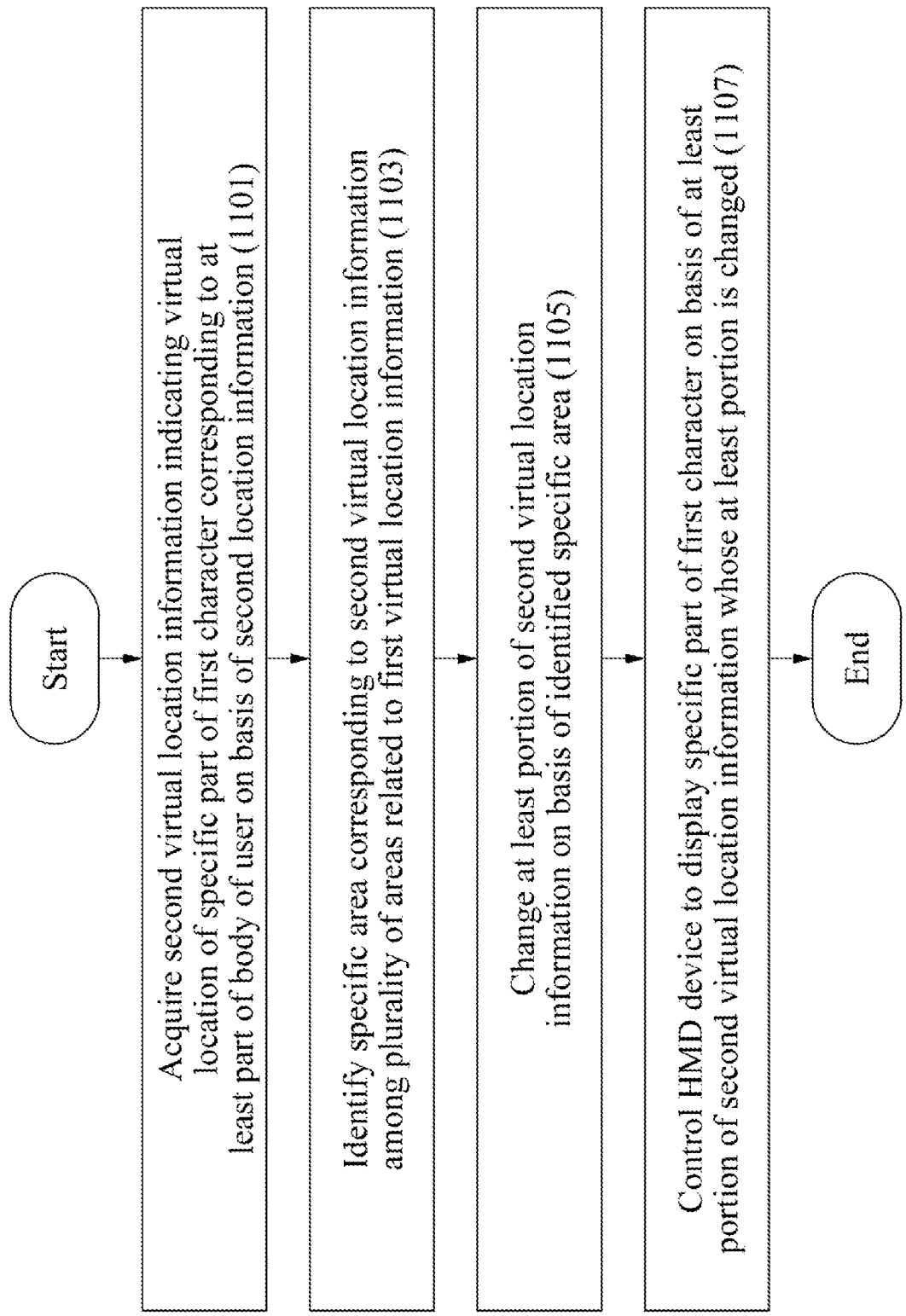
FIG. 11 is a flowchart for describing an operation in which the electronic device displays a first character by changing at least a part of second virtual location information according to various embodiments.
Figure 12:
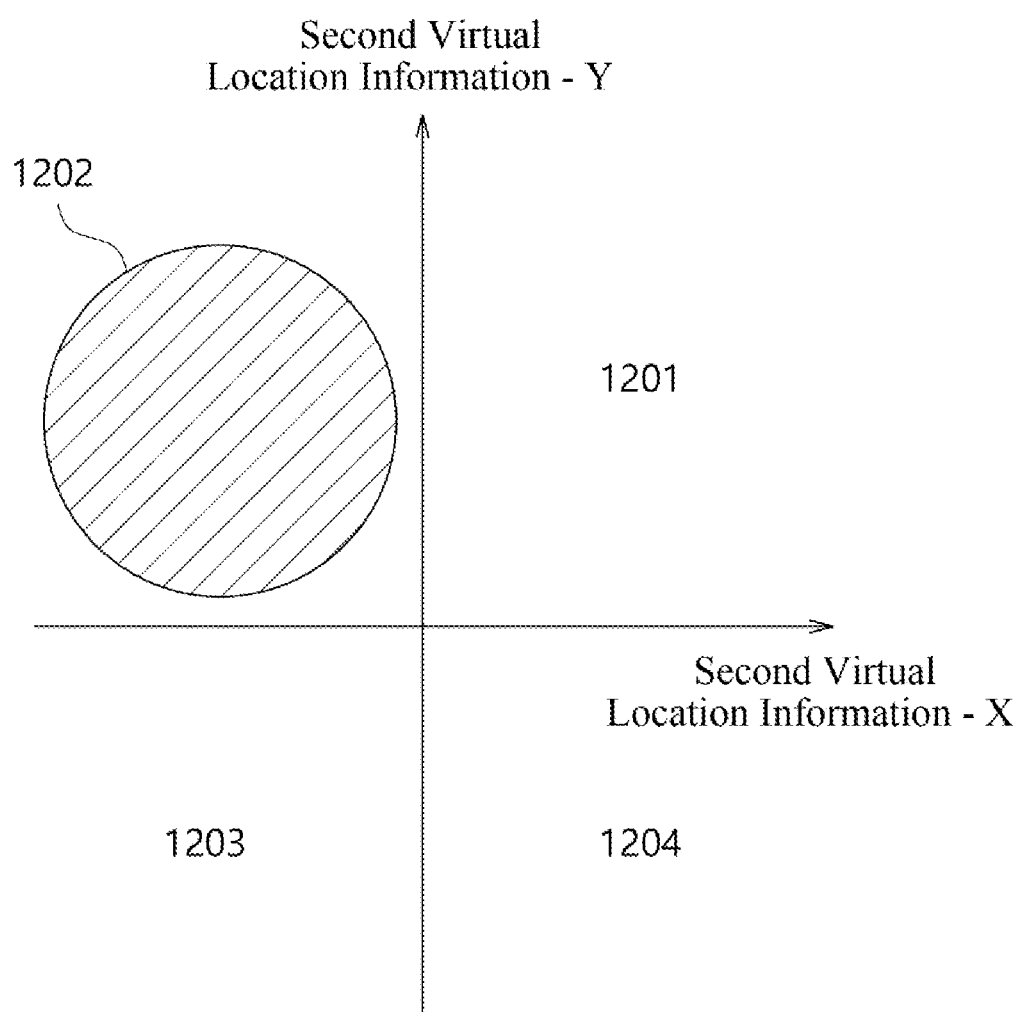
FIG. 12 is a diagram for describing a specific area identified according to various embodiments.

FIG. 11 is a flowchart for describing an operation in which the electronic device displays a first character by changing at least a part of second virtual location information according to various embodiments. FIG. 12 is a diagram for describing a specific area identified according to various embodiments.

Operations, which will be described below, may be performed in combination with each other. In addition, among the operations which will be described below, operations by the electronic device 1000 (e.g., the server 200 and the auxiliary computing device 300 of FIG. 1 and the electronic device 1000 of FIG. 9) may be operations by the processor 1100 of the electronic device 1000 (e.g., the server controller 240 of FIG. 2 and the auxiliary compute controller 340 of FIG. 3)

According to various embodiments, the operations shown in FIG. 11 are not limited to the shown order and may be performed in various orders. In addition, according to various embodiments, more operations may be performed, or at least one operation less than the operations shown in FIG. 11 may be performed.

Referring to FIG. 11, in operation 1101, the electronic device 1000 (e.g., the electronic device 1000 of FIG. 9, the server 200 of FIG. 1, or the auxiliary computing device 300 of FIG. 1) may acquire second location information indicating a virtual location of a specific part of the first character (e.g., the character 1410 of FIG. 14) corresponding to at least a part of the body of the user (e.g., the user 900 of FIG. 6) on the basis of the second location information described with reference to FIG. 10.

For example, the electronic device 1000 may acquire the second location information on the basis of the optical signal for the active marker 600 detected through the detecting device 100. For example, the electronic device 1000 may acquire second location information on a part of the body part of the user 900 to which the active marker 600 is provided in the tracking area 700 on the basis of the optical signal for at least one active marker 600 provided to the part of the body of the user 900.

According to various embodiments, in operation 1103, the electronic device 1000 may identify a specific area corresponding to the second virtual location information among a plurality of areas related to the first virtual location information described with reference to FIG. 10.

For example, the electronic device 1000 may acquire the first location information on the basis of the optical signal for the HMD device 400 acquired through the detecting device 100. For example, the electronic device 1000 may acquire the first location information on the user 900 in the tracking area 700 on the basis of the optical signal of the HMD device 400 worn on a part of the body of the user 900.

For example, the electronic device 1000 may identify the specific area corresponding to the second virtual location information among the plurality of areas related to the first virtual location information corresponding to a location of the user 900 in VR, which is acquired on the basis of the first location information.

According to various embodiments, a specific part of the first character (e.g., the character 1410) may correspond to a part of an elbow of the body of the first user (the user 900). However, the present disclosure is not limited thereto, and the specific part of the first character may correspond to various parts of the body of the first user.

According to various embodiments, the plurality of areas related to the first virtual location information may include areas corresponding to quadrants which are defined by a first axis extending in a first reference direction and a second axis extending in a second reference direction on the basis of the first virtual location information. For example, the plurality of areas related to the first virtual location information may include a first area 1201, a second area 1202, a third area 1203, and a fourth area 1204, which are defined by an x-axis of the second virtual location information and a y-axis of the second virtual location information.

According to various embodiments, the electronic device 1000 may change at least a portion of the second virtual location information on the basis of the specific area for the second virtual location information identified in operation 1105. For example, the electronic device 1000 may identify whether an area corresponding to the second virtual location information among the quadrant areas is an area requiring preset correction. For example, the electronic device 1000 may preset the area requiring the correction as the second area 1202 and identify whether an area corresponding to the second virtual location information is the second area 1202.

According to various embodiments, the area requiring the correction by the electronic device 1000 may be an area in which the first character corresponding to the first user may be expressed unnaturally, unlike a motion of an actual person. For example, when the second virtual location information is not corrected even though the second virtual location information is included in the area requiring the correction, a character may be displayed beyond a range of the back of the hand and elbow where a real person can take a motion.

According to various embodiments, the electronic device 1000 may change at least a portion of the second virtual location information to change a position of a specific part of the first character on the basis of the area corresponding to the second virtual location information being the area requiring the preset correction (e.g., the second area 1202). For example, the electronic device 1000 may change at least a portion of the second virtual location information to change a location so as to allow a position and a direction of the elbow of the first character to be displayed differently.

According to various embodiments, in operation 1107, the electronic device 1000 may control the HMD device 400 to display the specific part of the first character on the basis of at least a portion of the second virtual location information whose at least the portion is changed. For example, the electronic device 1000 may control the HMD device 400 to differently display the position and the direction of the elbow of the first character on the basis of at least the portion of the second virtual location information whose at least the portion is changed.

According to various embodiments, the present disclosure is not limited to the above-described example, in order to allow the character in VR to take a motion within a range where an actual person can take a motion, the electronic device 1000 may directly reflect the location information acquired through the HMD device 400 and the active marker 600, thereby preventing the HMD display 450 to display the location information and controlling the HMD display 450 to display a character corresponding to the user on the basis of virtual location information changed by acquiring the virtual location information whose at least the portion is changed of the location information acquired through the HMD device 400 and the active marker 600.

Figure 13:
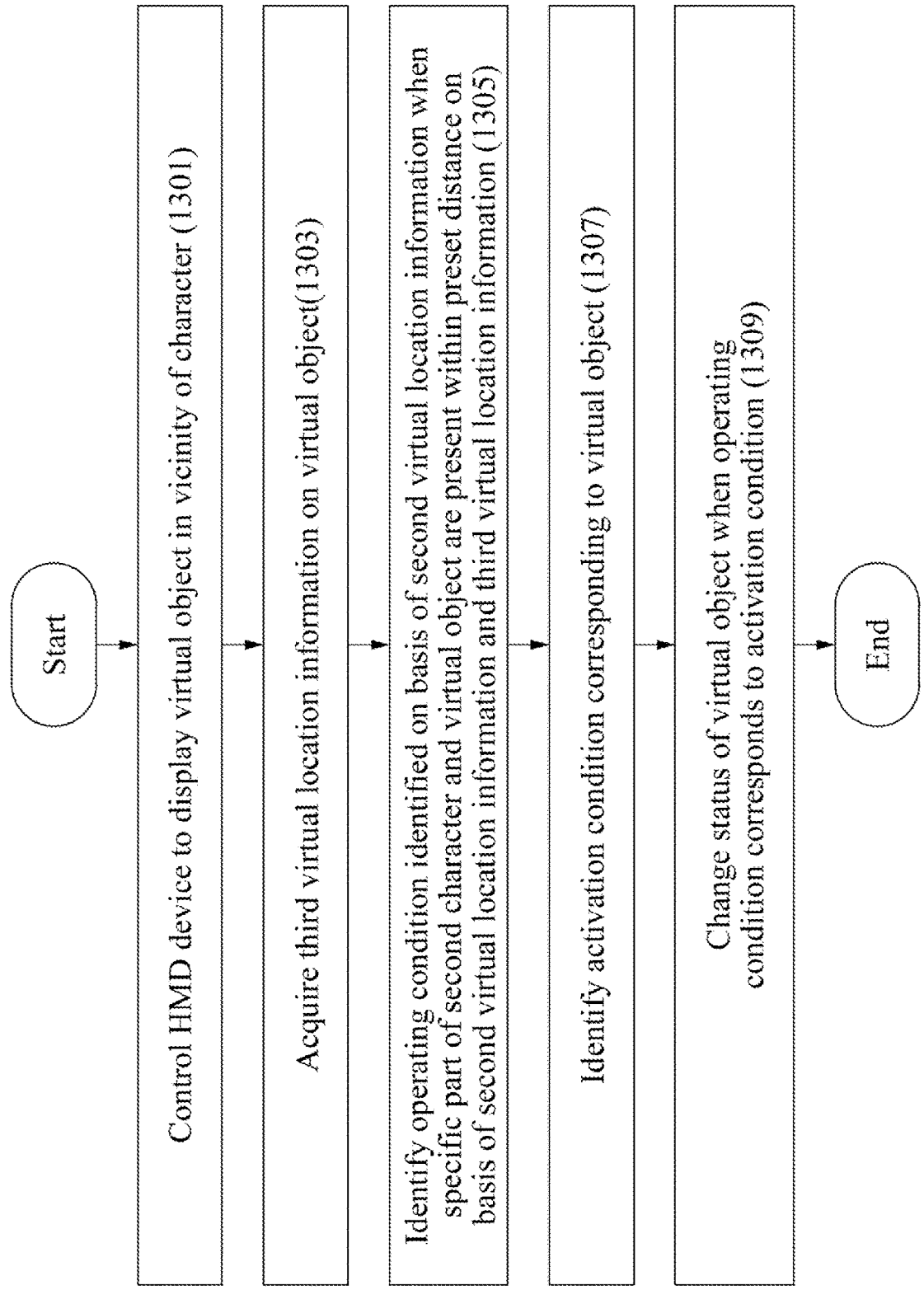
FIG. 13 is a flowchart for describing an operation on a virtual object according to various embodiments.

FIG. 13 is a flowchart for describing an operation on a virtual object according to various embodiments.

Operations, which will be described below, may be performed in combination with each other. In addition, among the operations which will be described below, operations by the electronic device 1000 (e.g., the server 200 and the auxiliary computing device 300 of FIG. 1 and the electronic device 1000 of FIG. 9) may be operations by the processor 1100 of the electronic device 1000 (e.g., the server controller 240 of FIG. 2 and the auxiliary compute controller 340 of FIG. 3).

According to various embodiments, the operations shown in FIG. 13 are not limited to the shown order and may be performed in various orders. In addition, according to various embodiments, more operations may be performed, or at least one operation less than the operations shown in FIG. 13 may be performed.

Referring to FIG. 13, the electronic device 1000 may control the HMD device 400 to display a virtual object (e.g., the virtual object VO of FIG. 14) in operation 1301. For example, the electronic device 1000 may control the HMD device to display the first character (e.g., the character 1410 of FIG. 14) corresponding to the first user (e.g., the user 900 of FIG. 6) and display a virtual character within a predetermined distance from the first character.

According to various embodiments, the electronic device 1000 may acquire third virtual location information on the virtual object in operation 1303. For example, the electronic device 1000 may acquire the third virtual location information which is virtual location information where the virtual object is located within VR.

According to various embodiments, in operation 1305, when a specific part of the first character and the virtual object are present within a preset distance on the basis of the second virtual location information and the third virtual location information, which are described with reference to FIG. 10, the electronic device 1000 may identify an operating condition identified on the basis of the second virtual location information.

For example, the electronic device 1000 may identify whether the specific part of the first character (e.g., the character 1410 of FIG. 14) corresponds to at least a portion of the body of the first user (e.g., the user 900 of FIG. 6) and the virtual object are present within the predetermined specified distance on the basis of the second virtual location information and the third virtual location information, which are acquired through the active marker 600. When it is determined that the specific part of the first character and the virtual object are present within the predetermined distance, the electronic device 1000 may identify an operating condition identified on the basis of the second virtual location information.

According to various embodiments, when the specific part of the first character and the virtual object are present within the predetermined distance, the electronic device 1000 may identify an activation condition corresponding to the virtual object in operation 1307. For example, the electronic device 1000 may set a condition in which the virtual object is activated to operate in VR in advance. Thus, the electronic device 1000 may identify the activation condition corresponding to the virtual object.

According to various embodiments, the virtual object may have various shapes. Thus, the electronic device 1000 may set various activation conditions in response to the shape of the virtual object.

According to various embodiments, the activation condition corresponding to the virtual object may correspond to a condition in which an actual object corresponding to the virtual object operates. For example, when the virtual object represents a valve, a condition in which the valve operates in reality may be the activation condition. For example, when the virtual object represents a hose, a condition in which the hose operates in reality may be the activation condition. According to various embodiments, the present disclosure is not limited to the above-described examples, and virtual objects corresponding to various devices in reality may present, and thus various activation conditions may be set.

According to various embodiments, when the operating condition corresponds to the activation condition, the electronic device 1000 may set to change a status of the virtual object in operation 1309. For example, when it is determined that the location information acquired on the basis of the second virtual location information satisfies the operating condition and the activation condition for the virtual object is satisfied on the basis of the third virtual location information, the electronic device 1000 may set to change the status of the virtual object. For example, the electronic device 1000 may set to control the HMD display 450 to change and display the status of the virtual object.

According to various embodiments, the electronic device 1000 may acquire changed second virtual location information, which is identified on the basis of optical signals for the active marker 600 detected through at least some of the plurality of detecting devices 100, according to movement of the first user. For example, the active marker 600 moves as the first user moves, and thus the electronic device 1000 may acquire changed second virtual location information on the active marker 600.

According to various embodiments, the electronic device 1000 may identify the operating condition on the basis of the changed second virtual location information. For example, when the virtual object is a valve, the electronic device 1000 may identify a rotating operation of the valve, which is the virtual object, as an operating condition through the active marker 600 according to the movement of the first user. According to various embodiments, the present disclosure is not limited to the above-described examples, and virtual objects corresponding to various devices in reality may present, and thus various operating conditions may be identified.

According to various embodiments, when the operating condition corresponds to the activation condition, the electronic device 1000 may control the HMD display 450 to change and display a VR image as the status of the virtual object is changed. For example, when the virtual object is a valve and the operating condition corresponds to the activation condition, the electronic device 1000 may control the HMD display 450 to vary transparency of a gas according to a rotation of the valve (e.g., including a rotation angle, a rotation speed, and a rotation angular velocity) and display a VR image.

Hereinafter, a disaster training content provided by the VR control system 10 according to various embodiments to the user 900 as a part of a virtual experience will be described with reference to FIG. 14.

Figure 14:
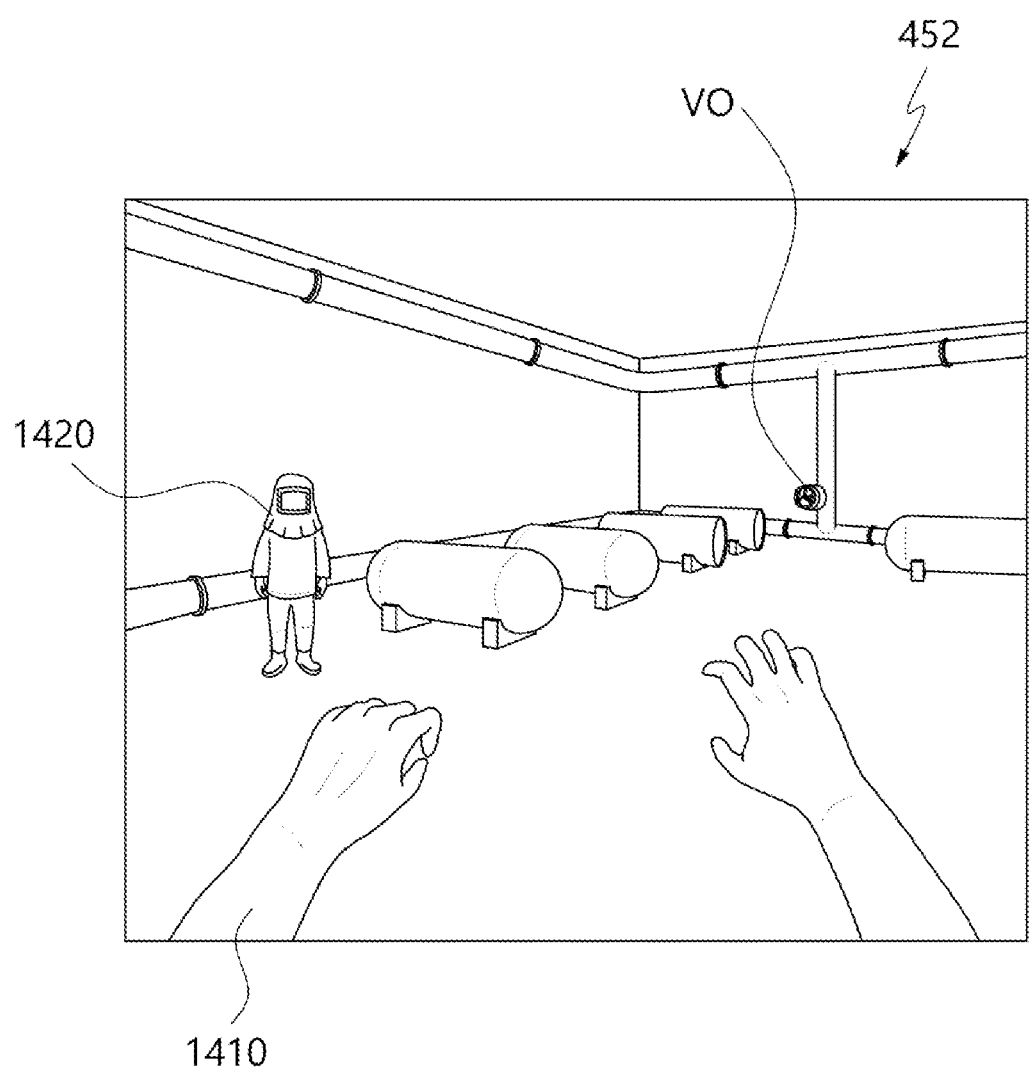
FIG. 14 is a diagram illustrating the virtual reality image according to various embodiments.

FIG. 14 is a diagram illustrating a VR image 452 according to various embodiments.

Referring to FIG. 14, the VR control system 10 may provide a disaster training content to the user 900.

Here, the disaster training content may include a content on a method of preparing for disasters in advance so as to respond to incidents, accidents, and problem situations that may occur in reality. For example, the disaster training content may include a training content to respond to a chemical accident that may occur within a factory handling chemical materials. Thus, the user 900 may experience the disaster in VR and prepare for the disaster in reality by conducting practical training.

Referring again to FIG. 9, in order to provide a disaster training content to the user 900, the VR control system 10 may provide the VR image 452 regarding the disaster training.

According to various embodiments, the VR image 452 may include a background and terrain related to the disaster, the character 1410, an opponent character 1420, and the virtual object VO.

According to various embodiments, the background and terrain related to the disaster may include geographic features and objects for expressing the disaster. For example, when the disaster is a chemical accident in a chemical plant, the VR image 452 may include plant equipment and chemical equipment such as vertical/horizontal piping, valves, storage tanks, pumps, and safety equipment.

According to various embodiments, the character 1410 may be a character corresponding to the user 900 in VR. For example, the character 1410 may be generated on the basis of virtual location information acquired by tracking the movement of the user 900 and move to correspond to the movement of the user 900.

According to various embodiments, the opponent character 1420 may include an NPC provided by an application or program pre-stored in the auxiliary computing device 300 and a character corresponding to a user other than the user 900. Specifically, the disaster training content provided by the VR control system 10 may be provided to a plurality of users. In this case, the plurality of users may cooperate to experience the disaster training in VR, and in VR, the character 1410 moving according to the movement of the user 900 and opponent characters 1420 as characters corresponding to movement of other users except for the user 900 may be provided.

According to various embodiments, the opponent character 1420 may correspond to a second user that is distinct from the user 900 (e.g., the first user described with reference to FIGS. 9 to 13). According to various embodiments, the electronic device 1000 may acquire third location information on the second user through the communication circuit 1200 on the basis of an optical signal for the second user in the tracking area 700, which is detected through at least some of the plurality of detecting devices 100.

According to various embodiments, the electronic device 1000 may acquire fourth virtual location information indicating a virtual location of the opponent character 1420 corresponding to the second user on the basis of the third location information.

According to various embodiments, the electronic device 1000 may control the HMD display 450 to display the opponent character 1420 corresponding to the second user together with the character 1410 on the basis of the fourth virtual location information.

According to various embodiments, the virtual object VO is a virtual object that is implemented in VR and used by the character and may include tools, equipment, a facility, and the like. For example, the virtual object VO may be displayed in VR to operate through the active marker 600 provided on at least a part of the body of the user 900 in reality. For example, the virtual object VO may include a chemical facility, a valve for controlling equipment, a spanner, a meter, and the like in the disaster training content.

According to various embodiments, the virtual object VO may be provided in VR by an application or program stored in the electronic device 1000 (e.g., the server 200, the auxiliary computing device 300, or the electronic device 1000) in advance. According to various embodiments, the virtual object VO may be generated on the basis of object information stored in the electronic device 1000 in advance or may be generated to correspond to a real object in reality.

Hereinafter, an event capable of being implemented in VR so as to provide a highly immersive disaster training content to the user 900 according to various embodiments will be described with reference to FIG. 15.

Figure 15:
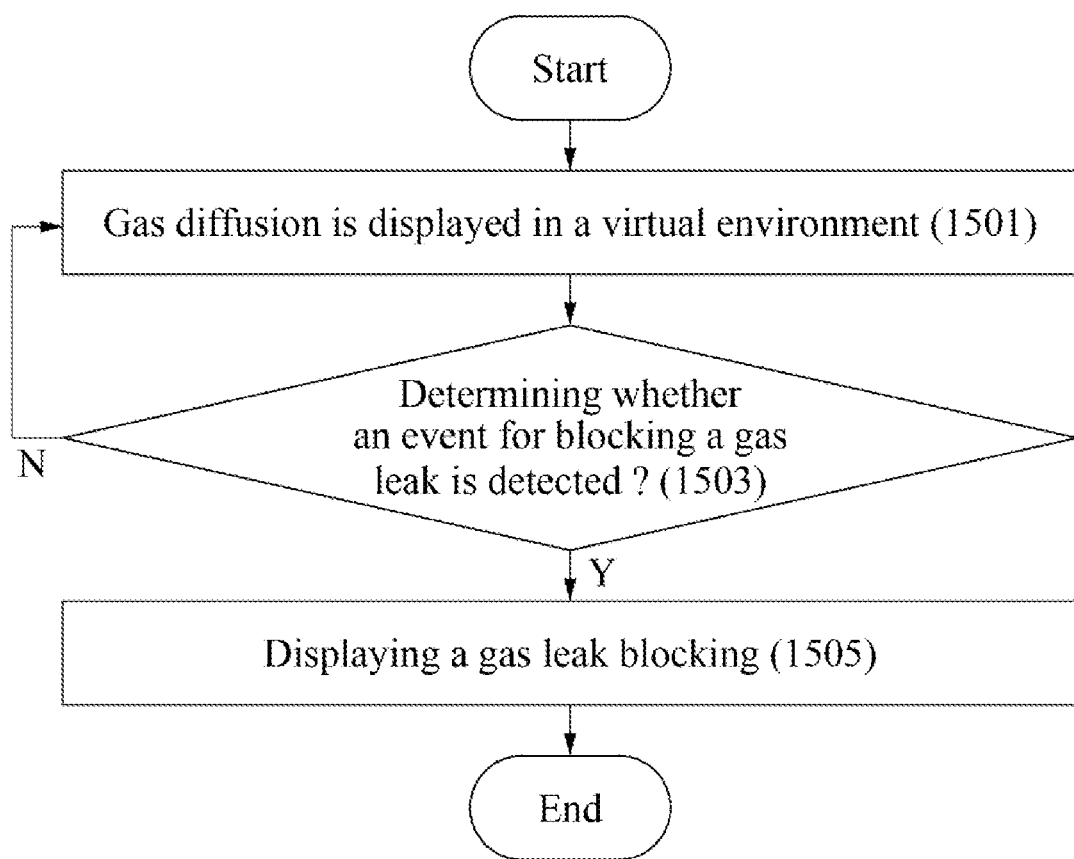
FIG. 15 is a flowchart illustrating a method of displaying leaking gas in virtual reality.

FIG. 15 is a flowchart illustrating a method of displaying leaked gas in VR.

Operations, which will be described below, may be performed in combination with each other. In addition, among the operations which will be described below, operations by the electronic device 1000 (e.g., the server 200 and the auxiliary computing device 300 of FIG. 1 and the electronic device 1000 of FIG. 9) may be operations by the processor 1100 of the electronic device 1000 (e.g., the server controller 240 of FIG. 2 and the auxiliary compute controller 340 of FIG. 3).

According to various embodiments, the operations shown in FIG. 15 are not limited to the shown order and may be performed in various orders. In addition, according to various embodiments, more operations may be performed, or at least one operation less than the operations shown in FIG. 15 may be performed.

According to various embodiments, the VR control system 10 may provide a chemical accident response training program to the user 900 as part of the disaster training content. In this case, the VR control system 10 may provide the user 900 in VR with a gas leak situation as one of the representative cases of chemical accidents.

Referring to FIG. 15, gas diffusion may be displayed in a virtual environment in operation 1501. For example, the electronic device 1000 may control the HMD display 450 to display diffusion of leaking gas.

According to various embodiments, a method of displaying leaking gas may include acquiring a diffusion model of leaking gas and displaying gas diffusion in a virtual environment.

According to various embodiments, the electronic device 1000 may acquire the diffusion model of leaking gas. In various embodiments, the diffusion model may be a shape or pattern in which a fluid, such as a gas or liquid, diffuses. For example, the diffusion model of leaking gas may be a model that represents a direction or speed in which a gas leaked from a chemical accident moves.

According to various embodiments, the leaking gas may be set on the basis of the nature of the disaster training content provided by the electronic device 1000 to the user 900. For example, the leaking gas may include a high-pressure gas, a liquefied gas, a compressed gas, and a flammable exhaust gas.

According to various embodiments, the electronic device 1000 may acquire data on the diffusion model of leaking gas using a simulation program or database on gas diffusion.

According to various embodiments, the electronic device 1000 may simplify the acquired diffusion model of leaking gas or acquire a common fluid flow model regardless of the type of leaking gas. In addition, the electronic device 1000 may display the leaking gas in VR using a preset diffusion model according to the type of gas.

According to various embodiments, the electronic device 1000 may display gas diffusion in VR. For example, the electronic device 1000 may display the leaking gas in the VR image 452 provided to the user 900 according to a scenario of the disaster training content provided to the user 900. Specifically, the electronic device 1000 may display the leaking gas in VR on the basis of virtual location information on the leaking gas acquired from the diffusion model of the leaking gas.

According to various embodiments, the electronic device 1000 may determine whether an event for blocking a gas leak is detected in operation 1503. According to various embodiments, the electronic device 1000 may determine whether the gas leak blocking event occurs due to the operation of the character 1410 in VR according to the scenario of the disaster training content provided to the user 900. For example, after a gas leak occurs in VR, when the character 1410 corresponding to the user 900 operates a valve to block the gas leak or temporarily blocks a portion where the gas leak occurs, the electronic device 1000 may determine that the a gas leak blocking event occurs.

According to various embodiments, the electronic device 1000 may determine that the character 1410 rotates a valve, which is the virtual object VO, so that the leak blocking event occurs on the basis of the location information acquired through the HMD device 400 and the active marker 600, which are provided to parts of the body of the user 900. For example, the electronic device 1000 may determine whether the gas leak blocking event occurs on the basis of performance of an operation similar to the operation described with reference to FIG. 13.

According to various embodiments, when the gas leak event is detected (YES in operation 1503), the electronic device 1000 may display a gas leak blocking in operation 1505. For example, the electronic device 1000 may control the HMD display 450 to display the gas leak blocking in VR. In addition, when the gas leak event is not detected (NO in operation 1503), the electronic device 1000 may control the HMD display 450 to continuously display diffusion of the leaking gas in VR.

According to various embodiments, when the leak gas blocking event is detected, the electronic device 1000 may control the HMD display 450 to display the gas leak blocking of gradually removing the leaking gas by adjusting brightness or transparency of the leaking gas displayed in the VR image 452 provided to the user 900.

According to various embodiments, when the gas leak blocking event is detected, the electronic device 1000 may provide a message or sound effect indicating that the gas leak is blocked in the VR image 452 provided to the user 900.

Figure 18:
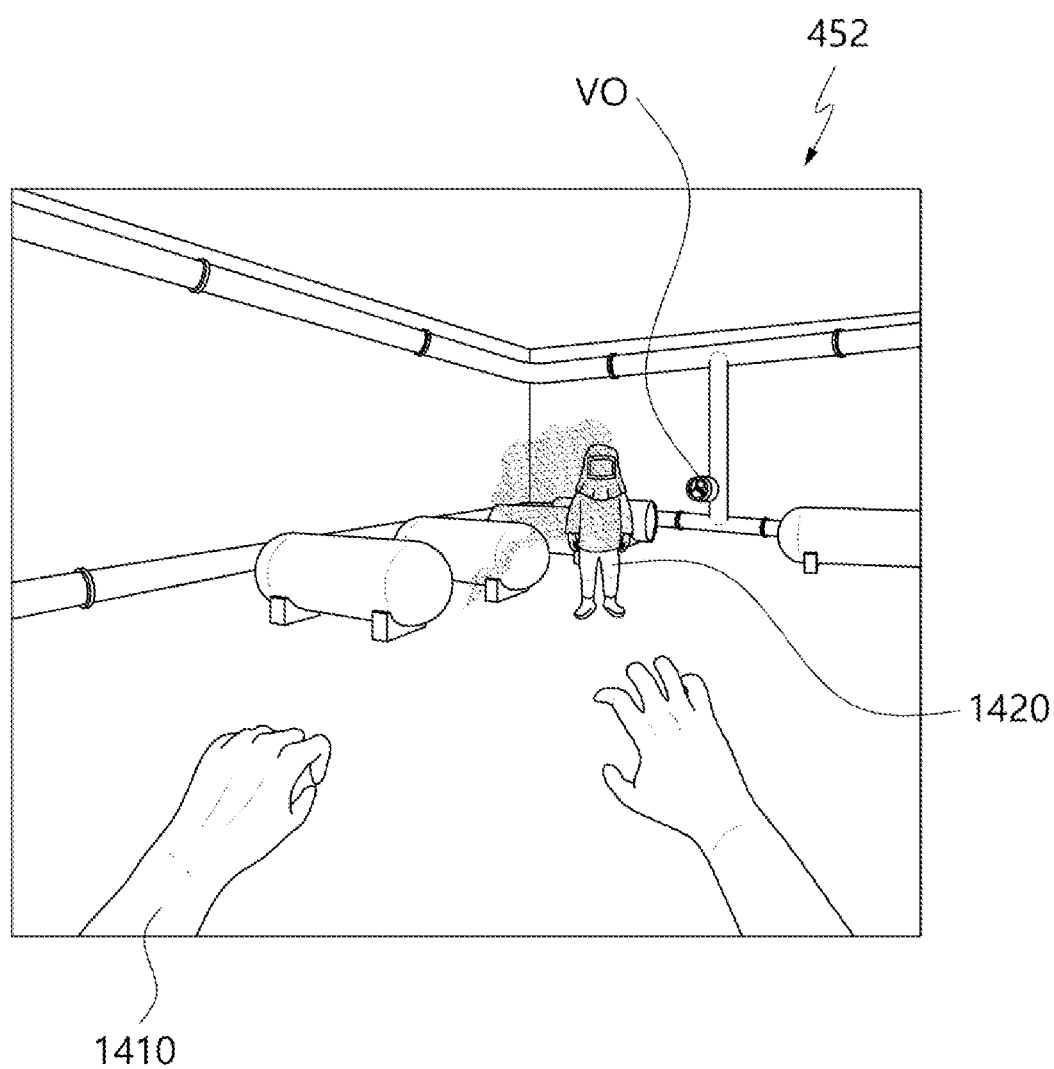
FIG. 18 is a diagram illustrating that the virtual object is displayed in the virtual reality according to various embodiments.

Hereinafter, a specific method of displaying a leaking gas in VR using the gas diffusion model will be described with reference to FIGS. 16 to 18.

Figure 16:
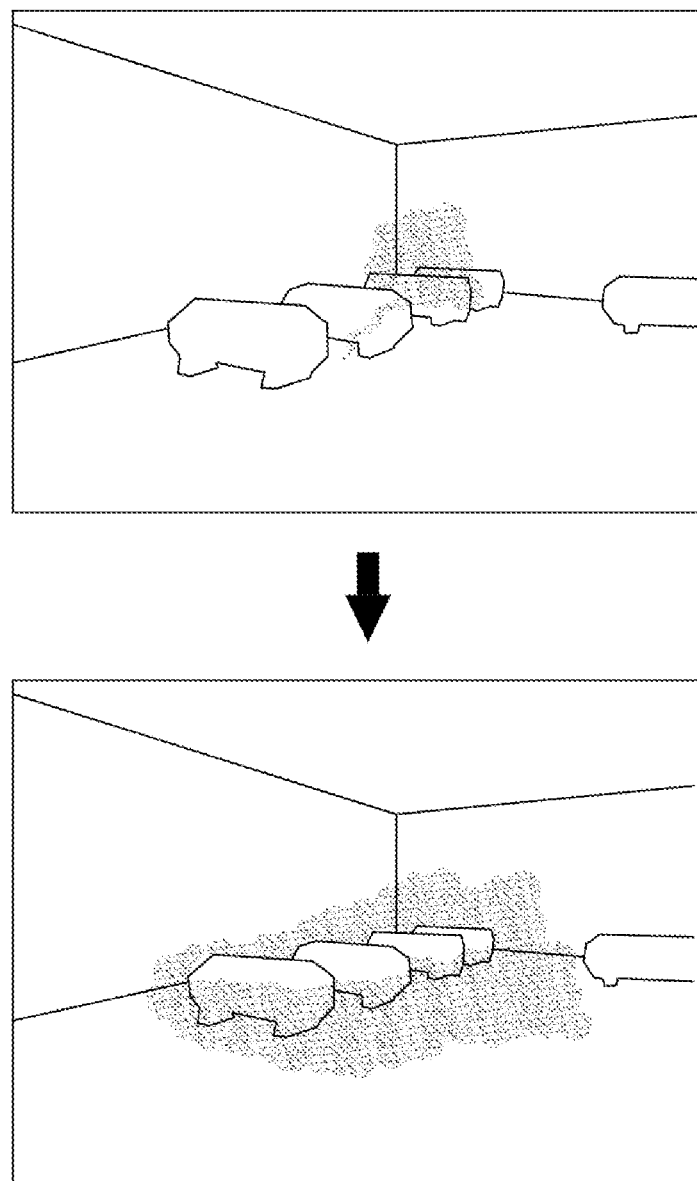
FIG. 16 is a diagram illustrating gas diffusion in virtual reality according to various embodiments.

FIG. 16 is a diagram illustrating gas diffusion in VR according to various embodiments. FIG. 17 is a diagram illustrating that a gas and a character are displayed in VR according to various embodiments. FIG. 18 is a diagram illustrating that the virtual object is displayed in VR according to various embodiments.

Hereinafter, the operation of the VR control system 10 may be performed through the electronic device 1000 (e.g., the server 200, the auxiliary computing device 300, and the electronic device 1000).

According to various embodiments, the VR control system 10 may acquire a diffusion model in which a gas leaks in an environment similar to VR which is to be provided to the user 900. For example, when the disaster training content provided to the user 900 has the background of a chemical plant with a plurality of storage tanks and a scenario includes a case in which a gas leaks from a specific storage tank, the VR control system 10 may acquire a gas diffusion model assuming the same/similar environment as the chemical plant.

According to various embodiments, the diffusion model may be set on the basis of a property of the leaking gas. For example, the diffusion model may be set by considering at least one among environments in which the gas leaks, such as a leak rate and a leak concentration of the leaking gas, a molecular weight or density of the leaking gas (e.g., chemical leakage), a path through which the leaking gas may move, and an ambient temperature. In this case, in order to acquire a more precise diffusion model of the leaking gas, a result value obtained by observing a fluid flow using a sensor or a fluid dynamics simulation program may be used. In addition, the diffusion model may be acquired as a two-dimensional or three-dimensional model and may be acquired as a two-phase flow or multi-phase flow.

According to various embodiments, the VR control system 10 may acquire data on the diffusion model using a simulation program or database on a gas diffusion model. For example, the VR control system 10 may acquire diffusion model data using computational fluid Dynamics (CFD), flame acceleration simulator (FLACS), consequence analysis (CA), or process hazard analysis software (PHAST).

According to various embodiments, the VR control system 10 may acquire data for displaying a gas leak event in VR from a diffusion model of leaking gas. For example, the VR control system 10 may calculate virtual location information on the leaking gas in VR using the diffusion model of the leaking gas. Specifically, the leaking gas diffusion model may include a set of spatial coordinates that change in time series, and the VR control system 10 may calculate the virtual location information on the leaking gas in VR on the basis of the set of time-varying spatial coordinates. As another example, the leaking gas diffusion model may include function data that can be displayed as a graph in a two or three dimension, and the VR control system 10 may calculate the virtual location information on the leaking gas in VR on the basis of the function data.

Referring to FIG. 16, the VR control system 10 may reflect the virtual location information of the leaking gas, which is acquired from the leaking gas diffusion model, and display the gas leak in the VR image 452 provided to the user 900.

According to various embodiments, the VR control system 10 may display the leaking gas in the VR image 452 using the virtual location information on the leaking gas, which is acquired from a diffusion model, and a color and transparency according to the type of the leaking gas.

According to various embodiments, when a preset condition is satisfied, the VR control system 10 may display the leaking gas in VR. For example, after the disaster training content is provided to the user 900, the leaking gas may be displayed in the VR image 452 according to an elapsed time. As another example, when it is determined that the character 1410 corresponding to the user 900 in VR moves in a preset direction or performs a preset motion in VR, the leaking gas may be displayed in the VR image 452.

According to various embodiments, referring to FIG. 17, the VR control system 10 may simultaneously display the leaking gas and an object at the same location in VR.

According to various embodiments, the virtual location information on the leaking gas may overlap the virtual location information on the virtual object VO, the character 1410, or the opponent character 1420 in VR. In this case, the VR control system 10 may set a priority between the overlapping virtual location information and display the virtual location information in the VR image 452 on the basis of the priority.

Hereinafter, a method of displaying a screen according to a motion of the user with respect to the virtual object in VR will be described in detail with reference to FIG. 19. For example, a method displaying leaking gas blocking in VR will be described in detail.

Figure 19:
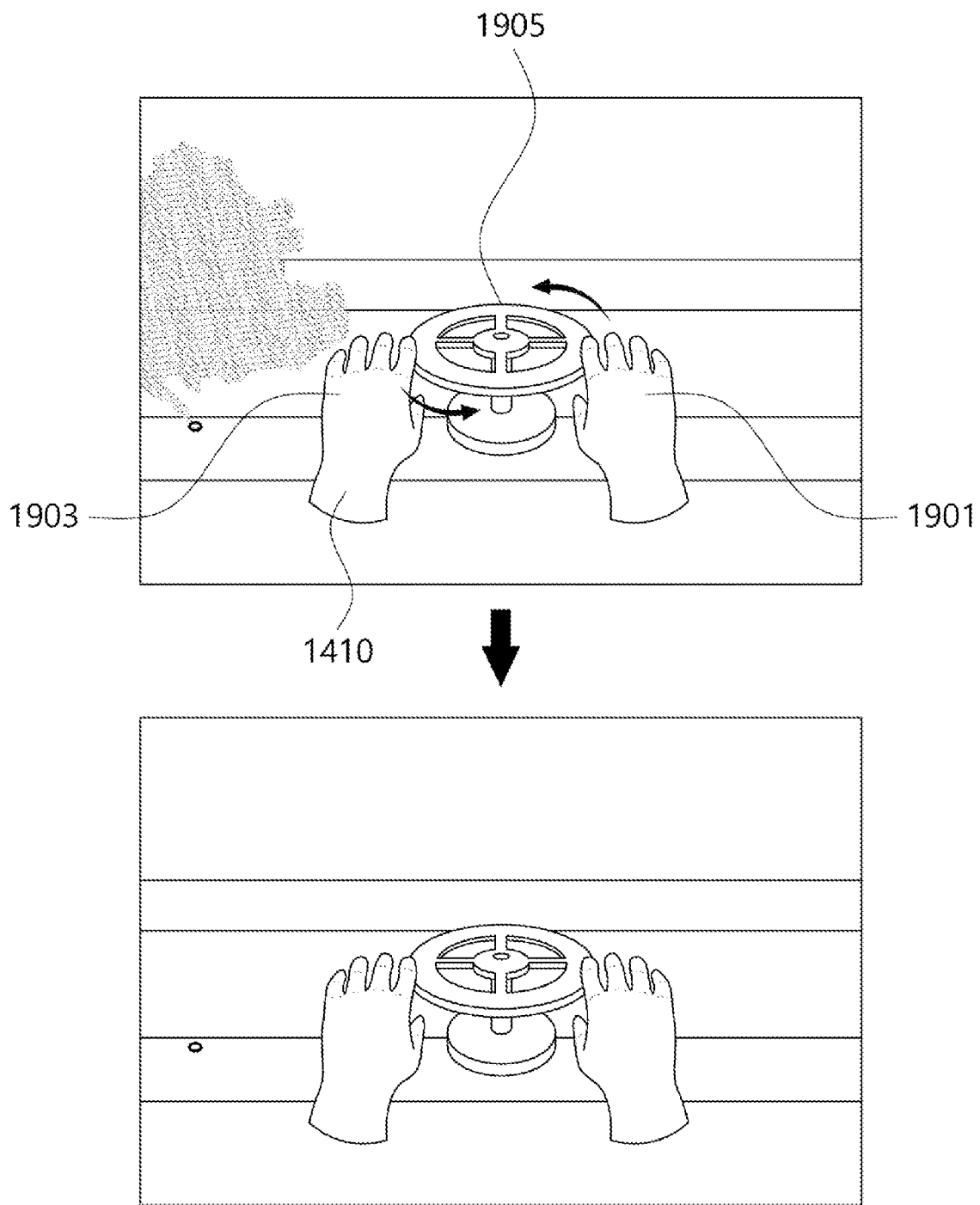
FIG. 19 is a diagram illustrating a display according to a motion of a user with respect to the virtual object in the virtual reality according to various embodiments.

FIG. 19 is a diagram illustrating a display according to a motion of a user with respect to the virtual object in virtual reality according to various embodiments.

FIG. 19 is a diagram illustrating showing gas blocking by a motion of the virtual object VO according to one embodiment of the present specification. The electronic device 1000 may detect a gas leak blocking event on the basis of the virtual location information of the character 1410 and the virtual object VO in VR and control the HMD display 450 to display gas leak blocking in the VR image 452.

Referring to FIG. 19, when the leak blocking event is detected, the electronic device 1000 may control the HMD display 450 to provide the user 900 with the VR image 452 showing the gas leak blocking.

For example, in a state in which the character 1410 is present within a preset distance from the virtual object VO in VR, when at least a part of the character 1410 performs a preset motion, the VR control system 10 may determine that the leak blocking event occurs. For example, when the character 1410 rotates a valve in VR, the leaking gas may be blocked.

According to various embodiments, the electronic device 1000 may control the HMD display 450 to display the leaking gas blocking in the VR image 452 on the basis of a change in virtual location information acquired from the HMD device 400 and the active marker 600 according to the motion of the user 900. For example, the electronic device 1000 may set a speed at which the leaking gas disappears, transparency of the leaking gas, or a speed at which a gas leaks on the basis of variances and change rates of virtual location information 1901 of a right hand and virtual location information 1903 of a left hand of the character 1410. For example, the electronic device 1000 may identify a rotational movement of a valve 1905, which is the virtual object VO, on the basis of the virtual position information acquired from the active marker 600 provided to at least a part of the body of the user 900.

According to various embodiments, as the character 1410 quickly rotates a handle of the valve in VR, the electronic device 1000 may reduce a gas leak amount of the faster or reduce a gas leak rate according to an amount of rotation of the handle of the valve. More specifically, when the virtual location information 1901 corresponding to the right hand of the character 1410 corresponding to the user 900 and the virtual location information 1903 corresponding to the left hand of character 1410, which are acquired through the active marker 600, are changed by a first angle or a first distance, the electronic device 1000 may remove the leaking gas by a first ratio or set the transparency of the leaking gas to a first value, and when the virtual location information 1901 corresponding to the right hand of the character 1410 corresponding to the user 900 and the virtual location information 1903 corresponding to the left hand of character 1410 are changed by a second angle that is greater than the first angle or a second distance that is greater than the first distance, the electronic device 1000 may remove the leaking gas by a second ratio that is greater than the first ratio or set the transparency of the leaking gas to a second value that is greater than the first value, thereby displaying the leaking gas in the VR image 452.

According to various embodiments, in contrast to the above-described case, the electronic device 1000 may control the HMD display 450 to display the gas leak in the VR image 452 on the basis of the motion of the user 900. For example, the electronic device 1000 may display the VR image 452 in which the leaking gas increases more rapidly or the transparency of the leaking gas decreases on the basis of the variances and change rates of the virtual position information 1901 corresponding to the right hand of the character 1410 corresponding to the user 900 and the virtual position information 1903 corresponding to the left hand of the character 1410, which are acquired through the active marker 600.

According to various embodiments, the VR control system 10 may additionally use the active marker 600 to recognize the motion of the character 1410 corresponding to the user 900 in detail with respect to a virtual object (e.g., the valve 1905) provided in VR and display various event occurrence screens according to the motion of the character 1410 through the HMD display 450.

What is claimed is:

1. A method of operating a virtual reality control system, comprising:
    acquiring, by a physical layer, first sensor data on a head-mounted display (HMD), worn on a body of a user and outputting an image, through an optical camera sensor installed in a large space;
    acquiring second sensor data on a tracking device, which is worn on the body of the user, through the optical camera sensor;
    acquiring, by a data handling layer, the first sensor data and the second sensor data into data for a content layer;
    transmitting, by the data handling layer, the data for the content layer to the content layer; and
    transmitting, by a presentation layer image output data including a character corresponding to the user to the HMD based on content change information;
    wherein the acquiring of the data for the content layer includes:
    acquiring first virtual location information indicating a virtual location of the character based on the first sensor data;
    acquiring second virtual location information indicating a virtual location of a specific part of the character corresponding to a part of the body of the user based on the second sensor data;
    determining whether an area corresponding to the second virtual location information among a plurality of divided location areas for at least part of the user's body, which can be formed based on the first virtual location information, corresponds to a preset correction target area;
    changing at least part of the second virtual location information based on the determination that the area corresponding to the second virtual location information is the correction target area; and generating the data for the content layer based on the first virtual location information and the changed second virtual location information,
wherein a display of a character based on the second virtual location information and a display of a character based on the changed virtual location information are distinguishable.

2. The method of claim 1, further comprising:
displaying, by the presentation layer, a-the character corresponding to the user based on the content change information.

3. The method of claim 1,
wherein the plurality of divided location areas include areas corresponding to respective quadrants defined by a first axis extending in a first reference direction and a second axis extending in a second reference direction, based on the first virtual location information.

4. The method of claim 1,
wherein the operation of changing at least part of the second virtual location information comprises:
changing at least part of the second virtual location information by the content layer to change a location of a part of the character's body; and
controlling the HMD by the presentation layer to display the changed location of the part of the character's body.

5. The method of claim 1,
wherein the tracking device includes a plurality of markers forming a preset pattern, and
wherein the second sensor data is acquired based on at least one of the plurality of markers.

6. The method of claim 1,
wherein the HMD includes a plurality of HMD markers forming a preset pattern, and
wherein the first sensor data is acquired based on at least one of the plurality of HMD markers.

7. An electronic device comprising:
a communication circuit configured to acquire optical signals through an optical camera sensor installed in a large space; and
at least one processor;
wherein the at least one processor is configured to:
acquire first sensor data on a head-mounted display (HMD) worn on a body of user and output an image through the optical camera sensor, by a physical layer;
acquire second sensor data for a tracking device which is worn on the body of the user through the optical camera sensor;
acquire the first sensor data and the second sensor data into data for a content layer, by a data handling layer;
transmit the data for the content layer to the content layer, by the data handling layer; and
transmit, by a presentation layer, image output data including a character corresponding to the user to the HMD based on content change information;
wherein, for acquiring the data for the content layer, the at least one processor is further configured to:
acquire first virtual location information indicating a virtual location of the character based on the first sensor data;
acquire second virtual location information indicating a virtual location of a specific part of the character corresponding to a part of the body of the user based on the second sensor data;
determine whether an area corresponding to the second virtual location information among a plurality of divided location areas for at least part of the user's body, which can be formed based on the first virtual location information, corresponds to a preset correction target area;
change at least part of the second virtual location information based on the determination that the area corresponding to the second virtual location information is the correction target area: and
generate the data for the content layer based on the first virtual location information and the changed second virtual location information,
wherein a display of a character based on the second virtual location information and a display of a character based on the changed virtual location information are distinguishable.

8. The electronic device of claim 7,
wherein the at least one processor is further configured to:
control the HMD to display a character corresponding to the user through the HMD based on the content change information by the presentation layer.

9. The electronic device of claim 7,
wherein the plurality of divided location areas include areas corresponding to respective quadrants defined by a first axis extending in a first reference direction and a second axis extending in a second reference direction, based on the first virtual location information.

10. The electronic device of claim 9,
wherein the at least one processor is further configured to:
change at least part of the second virtual location information to change a location of a part of the character's body by the content layer; and
control the HMD to display the character with the changed location of the part of the character's body by the presentation layer.

11. The electronic device of claim 7,
wherein the tracking device includes a plurality of markers forming a preset pattern, and
wherein the second sensor data is acquired based on at least one of the plurality of markers.

12. The electronic device of claim 7,
wherein the HMD includes a plurality of HMD markers forming a preset pattern, and
wherein the first sensor data is acquired based on at least one of the plurality of HMD markers.

* * * * *